(12) United States Patent
Lee et al.

(10) Patent No.: US 11,515,712 B2
(45) Date of Patent: Nov. 29, 2022

(54) BATTERY INCLUDING BATTERY SUB PACKS FOR INCREASING BATTERY CAPACITY

(71) Applicant: Samsung Electronics Co., Ltd., Suwon-si (KR)

(72) Inventors: Kyungmin Lee, Suwon-si (KR); Daehyun Kim, Suwon-si (KR); Kiyoung Kim, Suwon-si (KR); Jaehyuck Shin, Suwon-si (KR); Youngho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/796,134

(22) Filed: Feb. 20, 2020

(65) Prior Publication Data

US 2020/0373764 A1    Nov. 26, 2020

Related U.S. Application Data

(60) Provisional application No. 62/851,379, filed on May 22, 2019.

(30) Foreign Application Priority Data

Aug. 26, 2019    (KR) .................. 10-2019-0104732

(51) Int. Cl.
*H02J 7/00* (2006.01)
(52) U.S. Cl.
CPC .......... *H02J 7/0014* (2013.01); *H02J 7/0047* (2013.01); *H02J 7/0063* (2013.01)

(58) Field of Classification Search
CPC ...................................................... H02J 7/0014
(Continued)

(56) References Cited

U.S. PATENT DOCUMENTS 8,723,483 B2 *  5/2014  Shimizu .................... B60L 3/00
                                                    320/122
2010/0261043 A1  10/2010  Kim et al.
(Continued)

FOREIGN PATENT DOCUMENTS

DE    10 2016 007 935 A1    2/2017
EP        1 837 944 A2        9/2007
(Continued)

OTHER PUBLICATIONS

International Search Report dated Jun. 17, 2020, issued in International Application No. PCT/KR2020/003209.
(Continued)

*Primary Examiner* — Yalkew Fantu
(74) *Attorney, Agent, or Firm* — Jefferson IP Law, LLP

(57) ABSTRACT

A battery module including a plurality of battery sub packs and an electronic device including the battery module is provided. The battery module comprises a battery pack including a plurality of battery sub packs, a power delivery circuit connectable to the plurality of battery sub packs, a plurality of switches connected between the plurality of battery sub packs and the power delivery circuit, and at least one processor configured to control the plurality of switches to transmit power stored in a first battery sub pack to the power delivery circuit during a first time interval and transmit power stored in the power delivery circuit to a second battery sub pack during a second time interval. Other various embodiments are also provided herein.

20 Claims, 16 Drawing Sheets

(58) Field of Classification Search
USPC .......................................................... 320/118
See application file for complete search history.

(56) References Cited

U.S. PATENT DOCUMENTS

| | | | | |
|---|---|---|---|---|
| 2011/0080138 | A1* | 4/2011 | Nakanishi | H02J 7/0016 |
| | | | | 320/116 |
| 2011/0133558 | A1 | 6/2011 | Park | |
| 2011/0309795 | A1* | 12/2011 | Firehammer | H01M 10/4207 |
| | | | | 320/118 |
| 2013/0099747 | A1* | 4/2013 | Baba | H02J 7/0014 |
| | | | | 320/118 |
| 2014/0210419 | A1 | 7/2014 | Kim | |
| 2015/0194707 | A1 | 7/2015 | Park | |
| 2015/0295428 | A1 | 10/2015 | Moussaoui et al. | |
| 2016/0336564 | A1 | 11/2016 | Lee | |
| 2017/0108553 | A1 | 4/2017 | Ganesan et al. | |
| 2018/0212443 | A1* | 7/2018 | Ishikawa | H01M 10/42 |

FOREIGN PATENT DOCUMENTS

| | | | |
|---|---|---|---|
| JP | 2008-146875 | A | 6/2008 |
| JP | 2012-205407 | A | 10/2012 |
| KR | 10-2011-0062392 | A | 6/2011 |
| KR | 10-2012-0088541 | A | 8/2012 |
| KR | 10-2012-0098270 | A | 9/2012 |
| KR | 10-2013-0013108 | A | 2/2013 |
| KR | 10-2014-0096600 | A | 8/2014 |
| KR | 10-2014-0125942 | A | 10/2014 |
| KR | 10-2016-0134272 | A | 11/2016 |
| KR | 10-2017-0045140 | A | 4/2017 |
| KR | 10-1839032 | B1 | 3/2018 |
| KR | 10-2018-0079651 | A | 7/2018 |
| KR | 10-2020-0101864 | A | 8/2020 |

OTHER PUBLICATIONS

Extended European Search Report dated Feb. 9, 2022, issued in European Patent Application No. 20810517.1.

* cited by examiner

BATTERY INCLUDING BATTERY SUB PACKS FOR INCREASING BATTERY CAPACITY

CROSS-REFERENCE TO RELATED APPLICATION(S)

This application is based on and claims priority under 35 U.S.C. § 119(e) of a U.S. Provisional application Ser. No. 62/851,379, filed on May 22, 2019, in the U. S. Patent and Trademark Office, and under 35 U.S.C. § 119(a) of a Korean patent application number 10-2019-0104732, filed on Aug. 26, 2019, in the Korean Intellectual Property Office, the disclosure of which is incorporated by reference herein in its entirety.

BACKGROUND

1. Field

The disclosure relates to a battery module. More particularly, the disclosure relates to a plurality of battery sub packs and an electronic device including the battery module.

2. Description of Related Art

Electronic devices come in various types and shapes and so do batteries for powering electronic devices. Typically, battery packs in which multiple battery cells are connected together may be used for increasing the battery capacity of electric vehicles or robots which require large-capacity batteries.

For example, a plurality of battery cells may be connected in series with each other to provide an adequate voltage considering the voltage of a load powered by a battery. To increase battery capacity, a plurality of batteries (e.g., battery cells) may be connected in parallel with each other.

With relatively high energy, power density, and low costs as compared with other energy storage, batteries are widely in use for electronic devices. Repeated charge and discharge of a battery may result in gradual capacity drops and reduce the battery's lifespan.

For example, upon supplying power from a large-capacity battery pack to an electronic device, the entire battery pack (e.g., battery sub packs connected in parallel with each other) may feed a constant current. For example, lithium ion batteries, when used more and more, may undergo a fall in the capacity which represents the amount of power available once from the battery. Thus, with frequent use, batteries may be severely aged and, if all of the battery sub packs are used up regardless of the power required for the load, aging of the battery pack may be accelerated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a battery module including a plurality of battery sub packs, which may increase the lifespan of a battery pack including a plurality of battery sub packs by individually controlling the use of each battery sub pack depending on the context of the load in the battery pack, and an electronic device including the battery module.

Additional aspects will be set forth in part in the description which follows and, in part, will be apparent from the description, or may be learned by practice of the presented embodiments.

In accordance with an aspect of the disclosure, a battery module is provided. The battery module includes a plurality of battery sub packs, which may increase the lifespan of a battery pack including a plurality of battery sub packs and efficiently operate the battery by providing active balancing between the battery sub packs in the battery pack and an electronic device including the battery module.

In accordance with another aspect of the disclosure, a battery module comprising a battery pack is provided. The battery module includes a plurality of battery sub packs connectable in parallel with each other, a power delivery circuit connectable to the plurality of battery sub packs, a plurality of switches connected between the plurality of battery sub packs and the power delivery circuit, and at least one processor configured to control the plurality of switches to transmit power stored in a first battery sub pack among the plurality of battery sub packs to the power delivery circuit during a first time interval and transmit power stored in the power delivery circuit to a second battery sub pack among the plurality of battery sub packs during a second time interval.

In accordance with another aspect of the disclosure, an electronic device comprising a battery pack is provided. The electronic device includes a plurality of battery sub packs connectable in parallel with each other, a power delivery circuit connectable to the plurality of battery sub packs, a plurality of switches connected between the plurality of battery sub packs and the power delivery circuit, and at least one processor configured to control to transmit power stored in at least one of the plurality of battery sub packs to at least one load in a discharging mode, and control the plurality of switches to transmit power stored in a first battery sub pack among the plurality of battery sub packs to the power delivery circuit during a first time interval and to transmit power stored in the power delivery circuit to a second battery sub pack among the plurality of battery sub packs during a second time interval in a balancing mode.

In accordance with another aspect of the disclosure, a battery module is provided. The battery module includes a plurality of battery sub packs connectable in parallel with each other, a transformer connectable to the plurality of battery sub packs, and a plurality of switches connected between the plurality of battery sub packs and the transformer, wherein each of the plurality of battery sub packs includes a plurality of battery cells connected in series or parallel with each other.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken conjunction with the accompanying drawings, in which.

Throughout the drawings, like reference numerals will be understood to refer to like parts, components, and structures.

DETAILED DESCRIPTION

Figure 1:
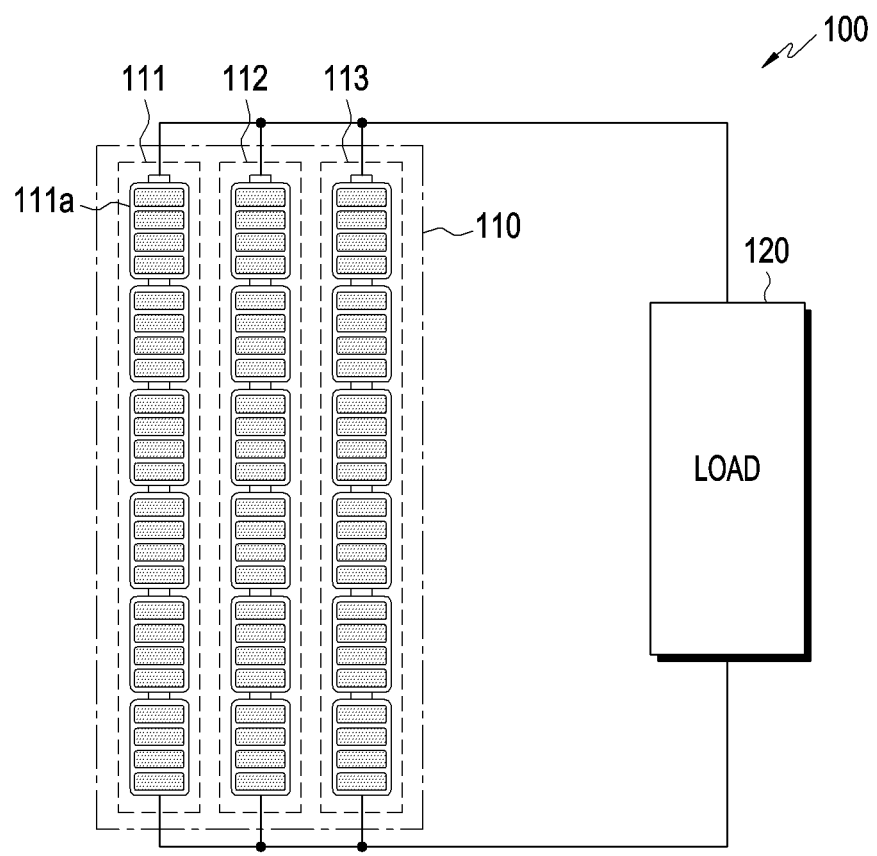
FIG. 1 is a view illustrating a configuration of an electronic device including a battery module according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device including a according to embodiments of the disclosure may include at least one of a smailphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a head-mounted display (HMD) device. The HMD device may include at least one of an accessory-type device (e.g., a watch, a ring, a bracelet, an anklet, a necklace, glasses, contact lenses, or a head-mounted device (HMD) or head-mounted display (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame.

According to an embodiment of the disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

FIG. 1 is a view illustrating a configuration of an electronic device including a battery module according to an embodiment of the disclosure. Referring to FIG. 1, an electronic device 100 may include a battery pack 110 and a load 120.

For example, when the electronic device 100 needs a large-capacity battery as does an electric vehicle or robot, power may be supplied to the load 120 by the battery pack 110 including a plurality of battery cells 111a connected in series or parallel with each other as shown in FIG. 1. Although FIG. 1 illustrates that the battery pack 110 is directly connected to the load 120 to provide power to the load 120, the battery pack 110 may include a plurality of ports each of which includes a load switch. According to an embodiment, at least one other component may be added between the battery pack 110 and the load 120. For example, a power management module (e.g., the power management module 1488 of FIG. 14) (e.g., a power management integrated circuit (PMIC) or a power management unit (PMU)) may be disposed between the battery pack 110 and the load 120, and the power management module may adjust the voltage of power supplied from the battery pack 110 and then supply the voltage-adjusted power to the load 120.

The plurality of battery cells 111a may be connected in series or parallel with each other, thereby constituting a single battery sub pack, such as battery sub packs 111, 112, and 113. For example, although FIG. 1 illustrates that the plurality of battery cells 111a are connected in series with each other, the plurality of battery cells 111a may be connected in parallel with each other, or the battery cells 111a may be connected in a combination of series connections and parallel connections.

The battery pack 110 may be configured by connecting the plurality of battery sub packs 111, 112, and 113 in parallel with each other. For example, each battery sub pack 111, 112, and 113 may be configured by connecting the plurality of battery cells 111a in series with each other to provide an adequate voltage considering the voltage of each load 120 to which the electronic device 100 is required to supply power. For example, when the voltage of power to be supplied to the load 120 is 18V, 18V power may be supplied to the load 120 by connecting six 3V battery cells 111a in series with each other. The battery pack 110 may be configured by connecting the plurality of battery sub packs 111, 112, and 113, each of which is constituted of the plurality of battery cells 111a, in parallel with each other, and as the number of battery sub packs connected in parallel with each other in the battery pack 110 increase, the capacity of the battery pack 110 may increase. Each battery cell 111a may include a positive electrode, a negative electrode, and an electrolyte.

Although FIG. 1 illustrates that one battery pack 110 includes three battery sub packs 111, 112, and 113 connected in parallel with each other for illustration purposes, two or four or more battery sub packs may be connected in parallel with each other to thereby configure one battery pack 110. Although FIG. 1 illustrates that one battery sub pack 111 includes six battery cells 111a connected in series with each other for illustration purposes, one battery sub pack may be constituted of one battery cell, or one battery sub pack may be configured by connecting two or more battery cells in series or parallel with each other or in a combination of series connections and parallel connections.

According to an embodiment, the load 120 may be any component that receives power and is driven in the electronic device 100. For example, when the electronic device 100 is a robot, the load 120 may be each component (e.g., the head, body, or arm) of the robot which is moved by a motor or various sensors provided in the robot. For example, when the electronic device 100 is an electric vehicle, the load 120 may be a motor for transferring mechanical power to the wheels or various sensors or parts equipped in the electric vehicle.

In various embodiments described below, the battery pack 110 or various circuits or components for controlling the battery pack 110 may be referred to as a battery module. For example, the battery module may include any components related to the operation of the battery pack except for the load 120.

Although not shown in FIG. 1, the battery pack 110 or each battery sub pack 111, 112, and 113 may include a battery management system (BMS) for controlling the state of battery. According to an embodiment, the BMS may be disposed in each battery sub pack 111, 112, and 113 or in each battery cell 111a. The BMS is described below in detail with reference to FIG. 10.

According to an embodiment, each battery sub pack 111, 112, and 113 may be manufactured to be attached to or detached from the battery pack 110. For example, when the battery pack 110 is manufactured as a structure (e.g., a frame) capable of being fastened to the electronic device 100, each battery sub pack 111, 112, and 113 may be individually attached to or detached from the structure. According to an embodiment, since the battery sub packs 111, 112, and 113 are connected in parallel with each other, although at least one battery sub pack is detached or a new battery sub pack is added in parallel, power may be supplied to the load 120 without changing the entire circuit.

Referring to FIG. 1, when the load 120 requires power, all of the battery sub packs 111, 112, and 113 connected in parallel with each other may supply the same current. For example, when a first battery sub pack sub_pack1 111, a second battery sub pack sub_pack2 112, and a third battery sub pack sub_pack3 113 are included as shown in FIG. 1, each battery sub pack 111, 112, and 113 may Supply ⅓ of the Current required by the load 120. According to an embodiment, if all of the battery sub packs 111, 112, and 113 are simultaneously used regardless of the power required by the load 120 so as to supply power to the load 120, the battery pack 110 may be aged rapidly.

Figure 2:
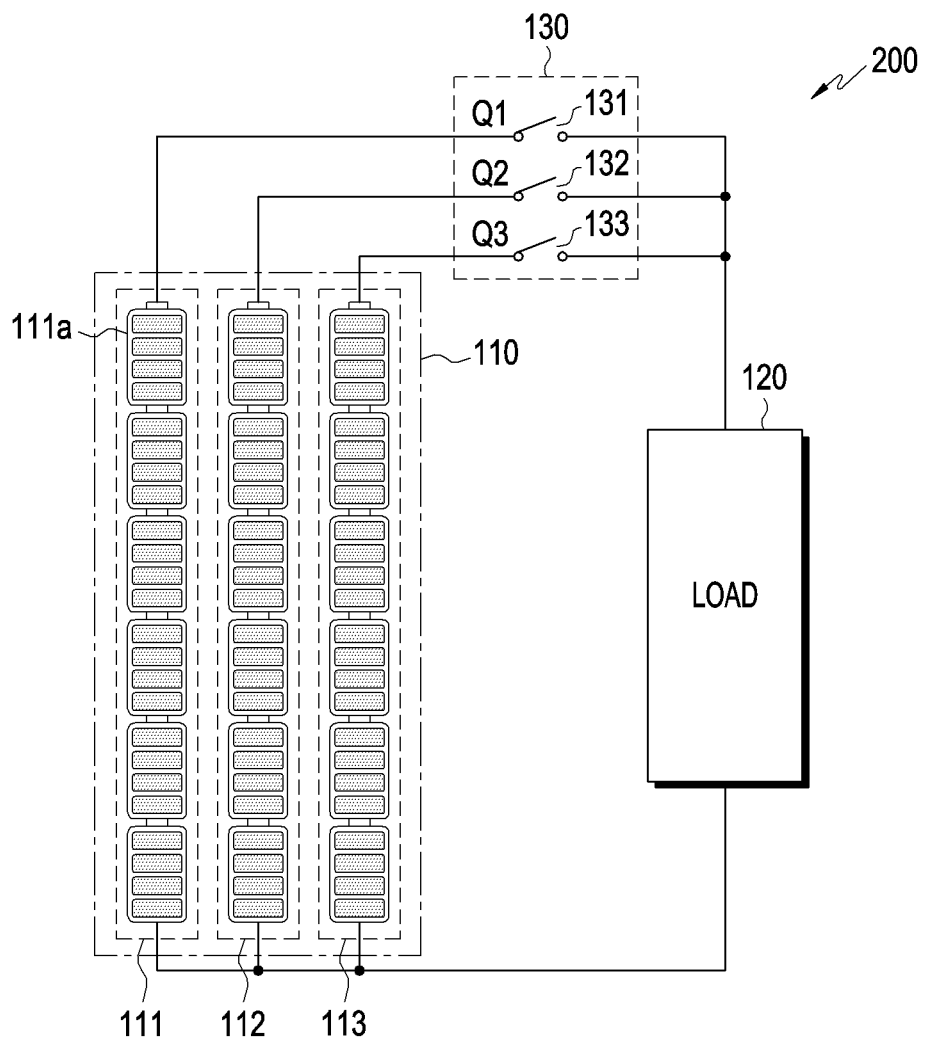
FIG. 2 is a view illustrating a configuration of an electronic device including a battery module according to an embodiment of the disclosure.

FIG. 2 is a view illustrating a configuration of an electronic device including a battery module according to an embodiment of the disclosure.

Referring to FIG. 2, an electronic device 200 may include the battery pack 110, including the battery sub packs 111, 112, and 113, and the load 120 described regarding FIG. 1 above. The electronic device 200 may further include a switching unit 130 including a plurality of switches 131, 132, and 133. For example, when the electronic device 200 is an electric vehicle or robot to which the battery use time or lifespan is critical, a reconfigurable battery as shown in FIG. 2 may be used. The reconfigurable battery may mean a battery that selectively uses the battery sub packs 111, 112, and 113 by controlling the switching unit 130 according to the context of the load 120. According to an embodiment, a first switch Q1 131 may be included between the first battery sub pack 111 and the load 120, a second switch Q2 132 may be included between the second battery sub pack 112 and the load 120, and a third switch Q3 133 may be included between the third battery sub pack 113 and the load 120.

For example, when the load 120 needs a relatively small amount of power, only any one of the first battery sub pack sub_pack1 111, the second battery sub pack sub_pack2 112, and the third battery sub pack sub_pack3 113 may be connected to the load 120, thereby supplying a small amount of power to the load 120. According to an embodiment, the switching unit 130 may control the first switch Q1 131 to turn on and the second switch Q2 132 and the third switch Q3 133 to turn off so that a relatively small amount of power may be supplied to the load 120.

According to an embodiment, when the load 120 needs a relatively large amount of power, two or three of the first battery sub pack sub_pack1 111, the second battery sub pack sub_pack2 112, and the third battery sub pack sub_pack3 113 may be connected to the load 120, thereby supplying a relatively large amount of power to the load 120. According to an embodiment, the switching unit 130 may control two or three of the first switch Q1 131, the second switch Q2 132, and the third switch Q3 133 to turn on and the rest to turn off, thereby supplying a relatively large amount of power to the load 120.

When implemented as a reconfigurable battery as shown in FIG. 2, each battery sub pack 111, 112, and 113 may have a different use time from the others, so that charging state or voltage may differ between the battery sub packs 111, 112, and 113. Since the battery sub packs 111, 112, and 113 are connected in parallel with each other, if the charging state or voltage differs between the battery sub packs 111, 112, and 113, over current may damage the circuit and resultantly the battery pack 110 or switching unit 130.

In various embodiments described below, there is disclosed a balancing circuit capable of adjusting the plurality of battery sub packs 111, 112, and 113 to have the same charging state or voltage. The balancing circuit described below may be referred to as active balancing since it adjusts the charging state or voltage by exchanging power between the plurality of battery sub packs 111, 112, and 113.

Figure 3:
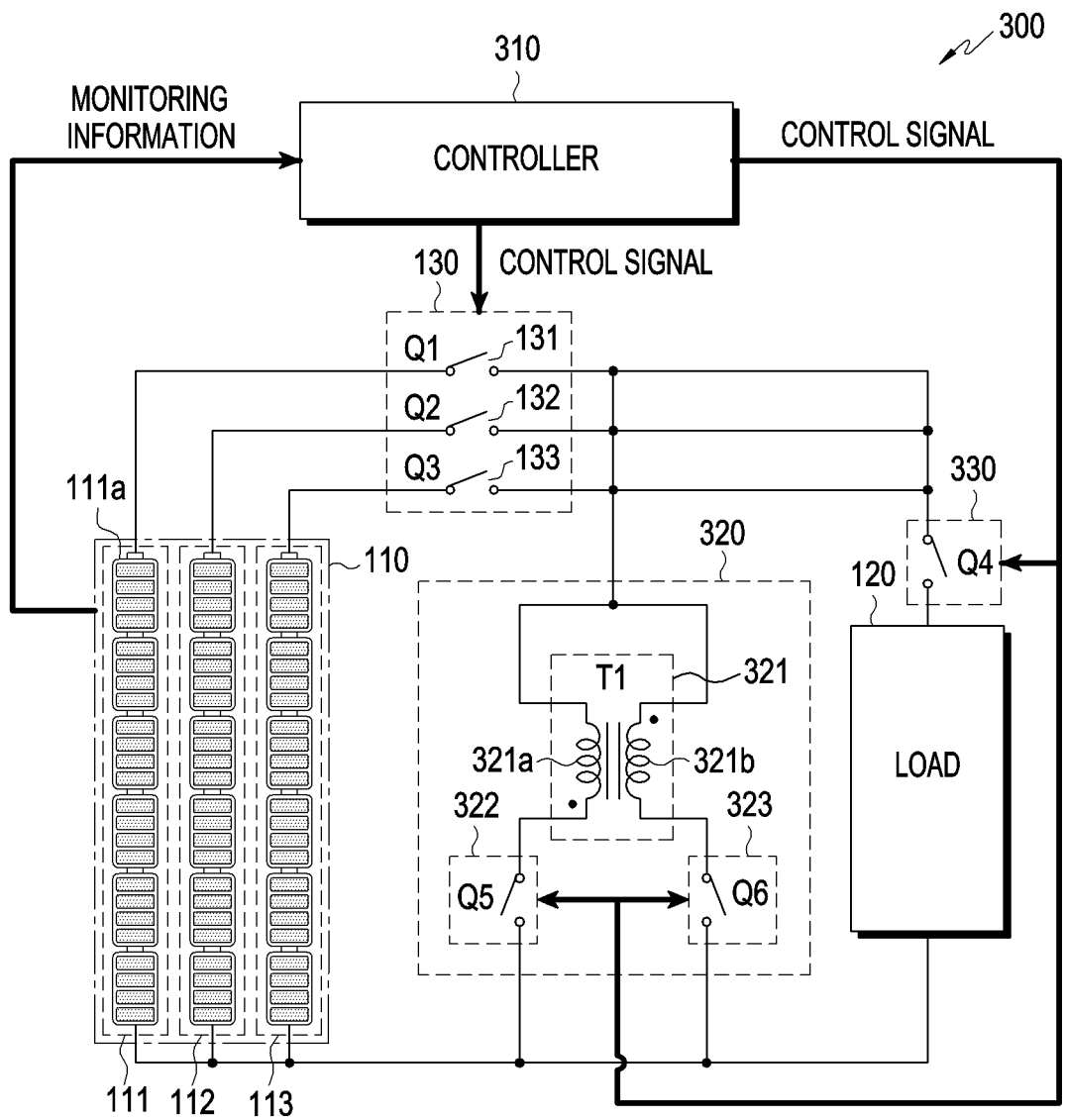
FIG. 3 is a view illustrating a configuration of an electronic device including a power delivery circuit according to an embodiment of the disclosure.

FIG. 3 is a view illustrating a configuration of an electronic device including a power delivery circuit according to an embodiment of the disclosure.

Referring to FIG. 3, an electronic device 300 may include the battery pack 110, the load 120, and the switching unit 130 including the plurality of switches 131, 132, and 133 described regarding FIGS. 1 and 2 above. The electronic device 300 may further include a controller 310, and a power delivery circuit 320. According to an embodiment, the electronic device 300 may further include a fourth switch Q4 330 for controlling the on/off of power supplied from the front end of the load 120 to the load 120. In FIG. 3, the battery module may include the battery pack 110, the switching unit 130, the controller 310, and the power delivery circuit 320.

According to an embodiment, the power delivery circuit 320 may include a primary coil 321a and a secondary coil 321b. The controller 310 may perform control to store power transferred from the first battery sub pack 111 in the primary coil 321a during a first time interval and transmit power induced from the primary coil 321a to the secondary coil 321b to the second battery sub pack 112 during a second time interval. The power delivery circuit 320 may be configured of any circuit that may temporarily charge power transferred from a specific battery sub pack and then discharge the power to another battery sub pack under the control of the controller 310. According to an embodiment, the power delivery circuit 320 may include an inductor and may store power received from a specific battery sub pack in the form of magnetic flux. For example, the power delivery circuit 320 may store power in the primary coil 321a during the first time interval, and transfer the stored power to the second battery sub pack 112 based on a magnetic coupling between the primary coil 321a and the secondary coil 321b during the second time interval. For example, when the power delivery circuit 320 includes an inductor, the inductance may be adjusted by changing at least one of the number of turns, diameter, or a distance between turns of the coil of the inductor, permeability of core, and the number of layers of turns.

According to an embodiment, the power delivery circuit 320 may include at least one transformer T1 321 and at least one switch (e.g., a fifth switch Q5 322 and a sixth switch Q6 323) as shown in FIG. 3. For example, in the power delivery circuit 320, the fifth switch 322 may be connected to the primary coil 321a of the transformer 321, and the sixth switch 323 may be connected to the secondary coil 321b. According to an embodiment, the primary coil 321a and secondary coil 321b of the transformer 321 may be disposed to have opposite polarities as shown. As the primary coil 321a and secondary coil 321b of the transformer 321 are disposed to have opposite polarities, the direction of current flowing when charging by the power delivery circuit 320 may be opposite to the direction of current flowing when discharging. Thus, the power delivery circuit 320 may perform charging and discharging with at least one battery sub pack 111, 112, and 113. According to an embodiment, the polarity of the primary coil 321a or the secondary coil 321b may be determined depending on the direction in which the coil is wound (e.g., clockwise or counterclockwise).

According to an embodiment, although FIG. 3 illustrates that the power delivery circuit 320 includes one transformer 321, embodiments of the disclosure are not limited thereto, and the power delivery circuit 320 may include a plurality of transformers. According to an embodiment, the power delivery circuit 320 may include various types of magnetic elements (e.g., inductors or transformers) or power storage elements (e.g., capacitors) capable of temporarily storing power as described above.

According to an embodiment, the power delivery circuit 320 may use one transformer to active-balance the plurality of battery sub packs 111, 112, and 113. For example, although at least one of the plurality of battery sub packs 111, 112, and 113 is removed, a new battery sub pack is added, or an existing battery sub pack is replaced with a new battery sub pack, active balancing may be provided via the single transformer.

The controller 310 may receive battery-related monitoring information from the battery pack 110, each battery sub pack 111, 112, and 113, or each battery cell 111a of each of the battery sub packs 111, 112, and 113. According to an embodiment, the battery-related monitoring information may include at least one of battery voltage information, current information, state-of-charge (SOC), or state-of-health (SOH), but not limited thereto.

The controller 310 may determine a discharging mode in which power is supplied from the battery pack 110 to the load 120 or a balancing mode in which active balancing is performed between the battery sub packs 111, 112, and 113 of the battery pack 110, and the controller 310 may control each switch included in the electronic device 300, thereby performing operations according to each mode.

According to an embodiment, the controller 310 may determine whether to allow the battery module to currently operate in the discharging mode or in the balancing mode based on the monitoring information received from the battery pack 110 and/or load information regarding load 120 according to the operation of the electronic device 300.

For example, as the electronic device 300 performs a specific operation so that power needs to be supplied to the load 120, the controller 310 may perform control to operate in the discharging mode. In the discharging mode, the controller 310 may perform control to transmit a control signal to the fourth switch 330 which is placed at the front end of the load 120 so that the fourth switch 330 turns on. The controller 310 may determine the number of battery sub packs to supply power or which one of the battery sub packs is used to supply power among the plurality of battery sub packs 111, 112, and 113 based on the power required by the load 120.

According to an embodiment, the controller 310 may perform control to turn on the first switch Q1 131 by a control signal upon determining to supply power to the load 120 by the first battery sub pack 111, turn on the second switch Q2 132 by a control signal upon determining to supply power to the load 120 by the second battery sub pack 112, and turn on the third switch Q3 133 by a control signal upon determining to supply power to the load 120 by the third battery sub pack 113.

Since no power is supplied to the power delivery circuit 320 in the discharging mode, the controller 310 may perform control to turn off the fifth switch Q5 322 and sixth switch Q6 323 of the power delivery circuit 320 by a control signal.

According to an embodiment, as the electronic device 300 performs no specific operation so that no power is supplied to the load 120, the controller 310 may perform control to operate in the balancing mode. According to an embodiment, although there is no need for supplying power to the load 120, if the same voltage is maintained between the plurality of battery sub packs 111, 112, and 113 or if the voltage differences between the battery sub packs 111, 112, and 113 are within a permitted range, control may be performed not to operate in the balancing mode.

Upon determining that the battery module operates in the balancing mode, the controller 310 may perform control to turn off the fourth switch 330 placed at the front end of the load 120 by a control signal. According to an embodiment, the controller 310 may adjust the charged amount or voltage between the battery sub packs by transferring power from at least one battery sub pack to another battery sub pack according to the operation in the balancing mode.

For example, the controller 310 may identify the monitoring information received from each battery sub pack 111, 112, and 113 and, upon determining that the charged amount or voltage of the first battery sub pack 111 is relatively larger than the charged amount or voltage of the third battery sub pack 113, supply the power of the first battery sub pack 111 to the third battery sub pack 113, thereby adjusting the voltage imbalance between the first battery sub pack 111 and the third battery sub pack 113.

According to an embodiment, the controller 310 controls the first switch 131 to turn on and the other switches, i.e., the second switch 132 and the third switch 133 to turn off during the first time interval. The controller 310 controls the fifth switch 322 of the power delivery circuit 320 to turn on and the sixth switch 323 to turn off during the first time interval. The power of the first battery sub pack 111 is applied to the primary coil of the transformer 321 via the first switch 131 during the first time interval under the control of the controller 310, and the transformer 321 may temporarily store the power supplied from the first battery sub pack 111 in the magnetic core in the form of magnetic flux.

According to an embodiment, after the first time interval elapses, the controller 310 may control the first switch 131 and the second switch 132 to turn off and the third switch 133 to turn on during the second time interval. The controller 310 controls the fifth switch 322 of the power delivery circuit 320 to turn off and the sixth switch 323 to turn on during the second time interval. The power applied to the primary coil of the transformer 321 during the second time interval under the control of the controller 310 may be induced to the secondary coil and, as the sixth switch 323 connected to the secondary coil is controlled to turn on, the power induced at the secondary coil may be transmitted through the third switch 133 to the third battery sub pack 113.

Figure 13:
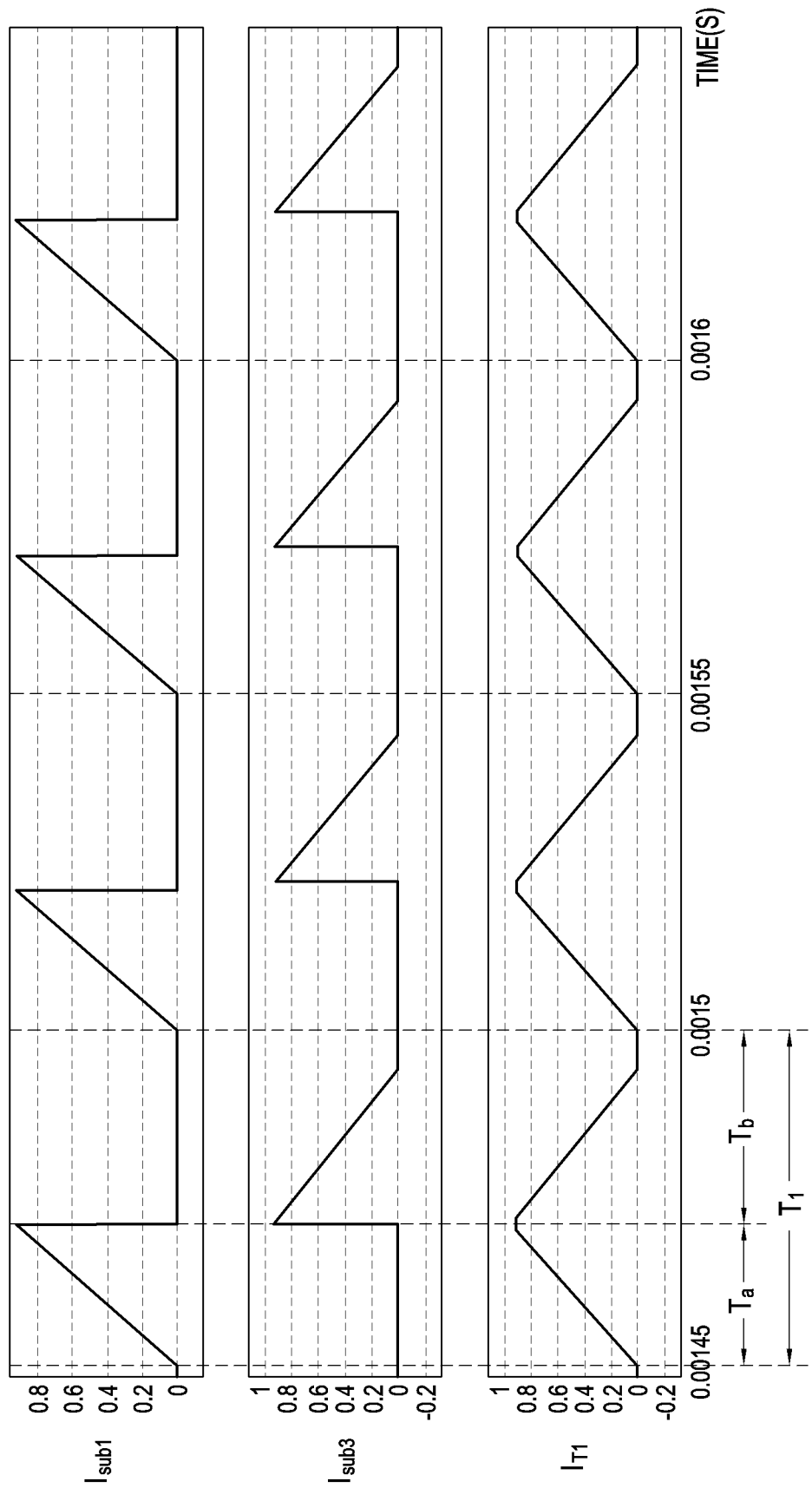
FIG. 13 is a graph illustrating variations in current in a balancing mode according to an embodiment of the disclosure.

According to an embodiment, the first time interval or the second time interval may be in a range from 1 μs to 100 μs. As shown in FIG. 13, as the operations of the first time interval and the second time interval are repeated, the power of the first battery sub pack 111 may be transferred to the third battery sub pack 113. The controller 310 may perform control to repeat the operations of the first time interval and the second time interval until the voltages of the first battery sub pack 111 and the third battery sub pack 113 are identical or voltage differences fall within a predetermined range.

According to an embodiment, each switch 131, 132, 133, 330, 322, and 323 may be configured of various switching elements. For example, each switch 131, 132, 133, 330, 322, and 323 may be constituted of a transistor (e.g., a field effect transistor (FET) or metal-oxide semiconductor field-effect transistor (MOSFET)).

Operations in the discharging mode and balancing mode are described below in detail with reference to embodiments thereof and FIGS. 4 to 9.

Figure 4:
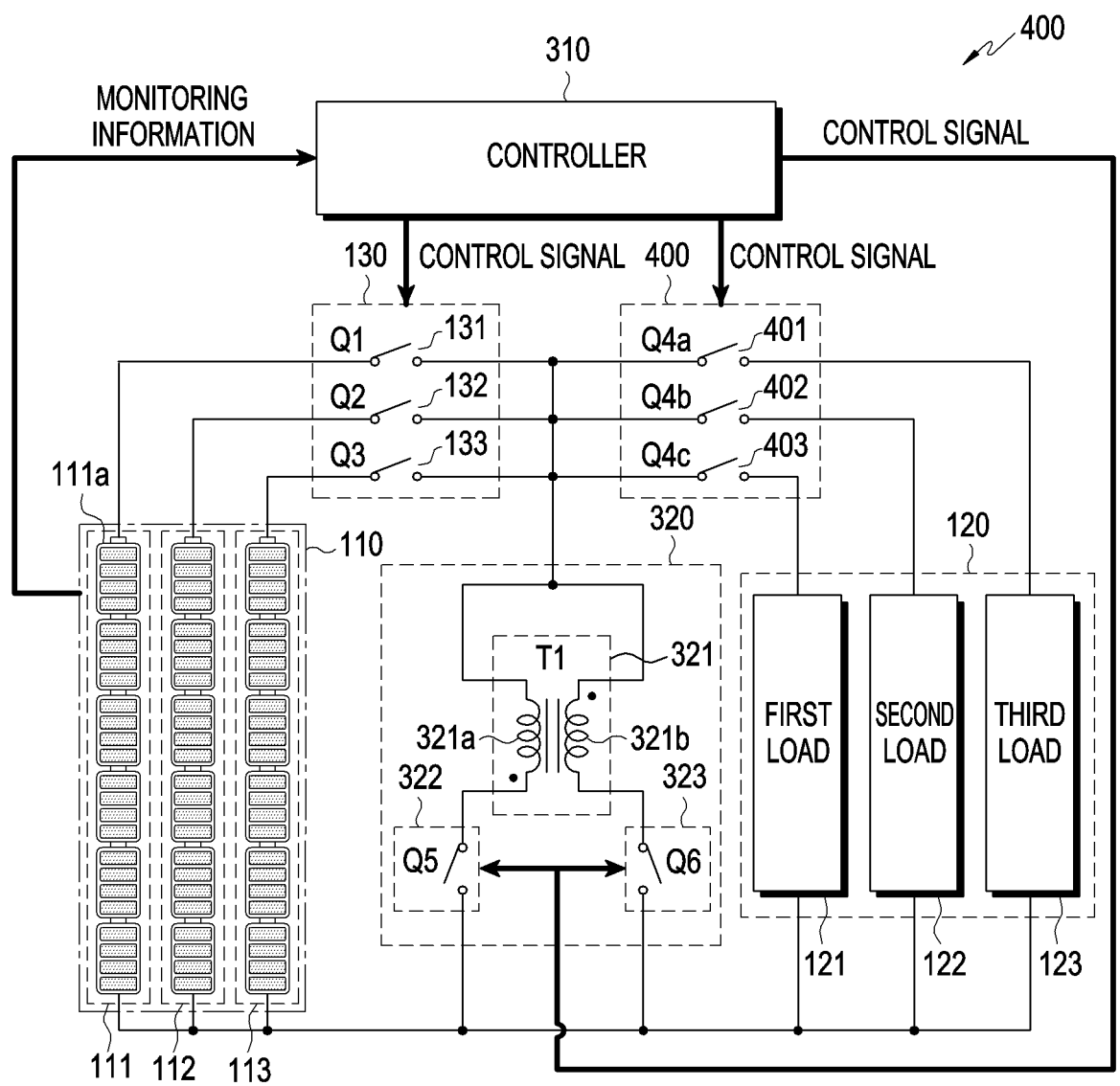
FIG. 4 is a view illustrating a configuration of an electronic device including a power delivery circuit according to an embodiment of the disclosure.

FIG. 4 is a view illustrating a configuration of an electronic device including a power delivery circuit according to an embodiment of the disclosure.

Referring to FIG. 4, the electronic device 400 may include the battery pack 110 described regarding FIGS. 1-3 above, and be configured to supply power from the plurality of battery sub packs 111, 112, and 113 to different loads 121, 122, and 123. The electronic device 400 may further include switches (e.g., a 4ath switch Q4a 401, a 4bth switch Q4b 402, and a 4cth switch Q4c 403) individually corresponding to the different loads 121, 122, and 123.

According to an embodiment, the electronic device 400 may supply power to each of the plurality of loads. For example, the load 120 of FIG. 3 may be divided into the first load 121, the second load 122, and the third load 123. According to an embodiment, when the electronic device 400 is a robot, the first load 121, the second load 122, and the third load 123, respectively, may correspond to the head, body, and arm of the robot.

According to an embodiment, when there is the need for supplying power from the first battery sub pack 111 to the first load 121, the controller 310 may control the first switch 131 and the 4ath switch 401 to turn on by a control signal.

According to an embodiment, when there is the need for supplying power from the second battery sub pack 112 to the second load 122, the controller 310 may control the second switch 132 and the 4bth switch 402 to turn on by a control signal.

According to an embodiment, when there is the need for supplying power from the third battery sub pack 113 to the third load 123, the controller 310 may control the third switch 133 and the 4cth switch 403 to turn on by a control signal.

According to an embodiment, the controller 310 may allow the battery sub packs 111, 112, and 113 to supply power to the loads 121, 222, and 123, respectively, thereby adjusting the use time of each battery sub pack depending on the amount of power required by each load.

For example, when the electronic device 400 is a robot, if the head of the robot does not move, the controller 310 may perform control not to use the battery sub pack connected with the head of the robot. According to an embodiment, the use of battery may be minimized by controlling the use time of each battery sub pack, thereby slowing down aging of the battery and extending the total lifespan of the battery pack 110. Further, the controller 310 may individually manage and control the battery for each battery sub pack 111, 112, and 113.

Figure 5:
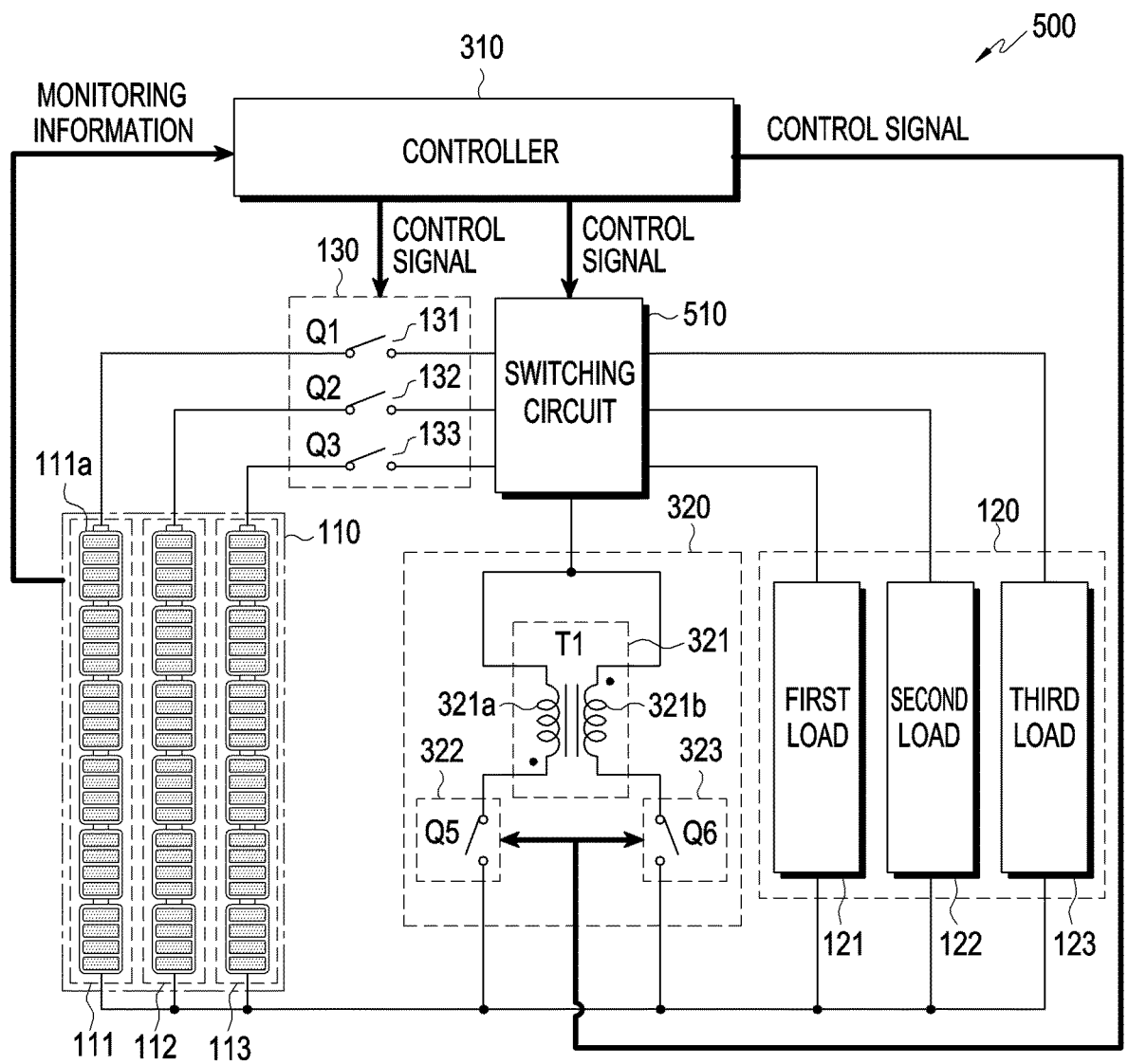
FIG. 5 is a view illustrating a configuration of an electronic device including a power delivery circuit according to an embodiment of the disclosure.

FIG. 5 is a view illustrating a configuration of an electronic device including a power delivery circuit according to an embodiment of the disclosure.

Referring to FIG. 5, the electronic device 500 may include the battery pack 110 described regarding FIGS. 1-4 above, and be configured to supply power from the plurality of battery sub packs 111, 112, and 113 to the different loads 121, 122, and 123. The electronic device 500 may further include a switching circuit 510 to supply power to each different load.

According to an embodiment, the electronic device 500 may supply power to each of the plurality of loads 121, 122, and 123. For example, the load 120 of FIG. 3 may be divided into the first load 121, the second load 122, and the third load 123. According to an embodiment, when the electronic device 500 is a robot, the first load 121, the second load 122, and the third load 123, respectively, may correspond to the head, body, and arm of the robot.

According to an embodiment, when there is the need for supplying power from the first battery sub pack 111 to the first load 121, the controller 310 may control the first switch 131 to turn on by a control signal and control the switching circuit 510 to connect the path connected via the first switch 131 to the first load 121. According to an embodiment, when there is the need for supplying power from the first battery sub pack 111 to the second load 122, the controller 310 may control the first switch 131 to turn on by a control signal and control the switching circuit 510 to connect the path connected via the first switch 131 to the second load 122. According to an embodiment, when there is the need for supplying power from the first battery sub pack 111 to the third load 123, the controller 310 may control the first switch 131 to turn on by a control signal and control the switching circuit 510 to connect the path connected via the first switch 131 to the third load 123.

In the same manner as above, the controller 310 may perform control to allow power from the second battery sub pack 112 to be supplied to the first load 121, the second load 122, or the third load 123 and power from the third battery sub pack 113 to be supplied to the first load 121, the second load 122, or the third load 123.

According to an embodiment, the controller 310 may perform control to allow power from the first battery sub pack 111 to be supplied simultaneously to the first load 121 and the second load 122. For example, the controller 310 may control the first switch 131 to turn on and may control the switching circuit 510 to allow the path connected via the first switch 131 to be simultaneously connected to the first load 121 and the second load 122. According to an embodiment, the controller 310 may perform control to allow power from the first battery sub pack 111 to be supplied simultaneously to the first load 121, the second load 122, and the third load 123. For example, the controller 310 may control the first switch 131 to turn on and may control the switching circuit 510 to allow the path connected via the first switch 131 to be simultaneously connected to the first load 121, the second load 122, and the third load 123.

According to an embodiment, the controller 310 may control each switch 131, 132, and 133 of the switching unit 130 and the switching circuit 510, thereby allowing power from each battery sub pack 111, 112, and 113 to be supplied to each load 121, 122, and 123 via various paths.

According to an embodiment, when the electronic device 500 is operated in the balancing mode, the controller 310 may control each switch 131, 132, and 133 of the switching unit 130 and the switching circuit 510, thereby temporarily storing the power supplied from any one of the plurality of battery sub packs 111, 112, and 113 in the power delivery circuit 320 and then supplying the power stored in the power delivery circuit 320 to another battery sub pack. For example, upon transferring power from the first battery sub pack 111 to the second battery sub pack 112 in the balancing mode, the controller 310 may control the first switch 131 to turn on and the other switches, i.e., the second switch 132 and the third switch 133, to turn off during the first time interval. The controller 310 may control the switching circuit 510, allowing the power from the first battery sub pack 111 to be supplied to the power delivery circuit 320 via the first switch 131 during the first time interval. The controller 310 controls the second switch 132 to turn on and the other switches, i.e., the first switch 131 and the third switch 133 to turn off during the second time interval. The controller 310 may control the switching circuit 510, allowing the power stored in the power delivery circuit 320 to be supplied to the second battery sub pack 112 via the second switch 132 during the second time interval.

Figure 6:
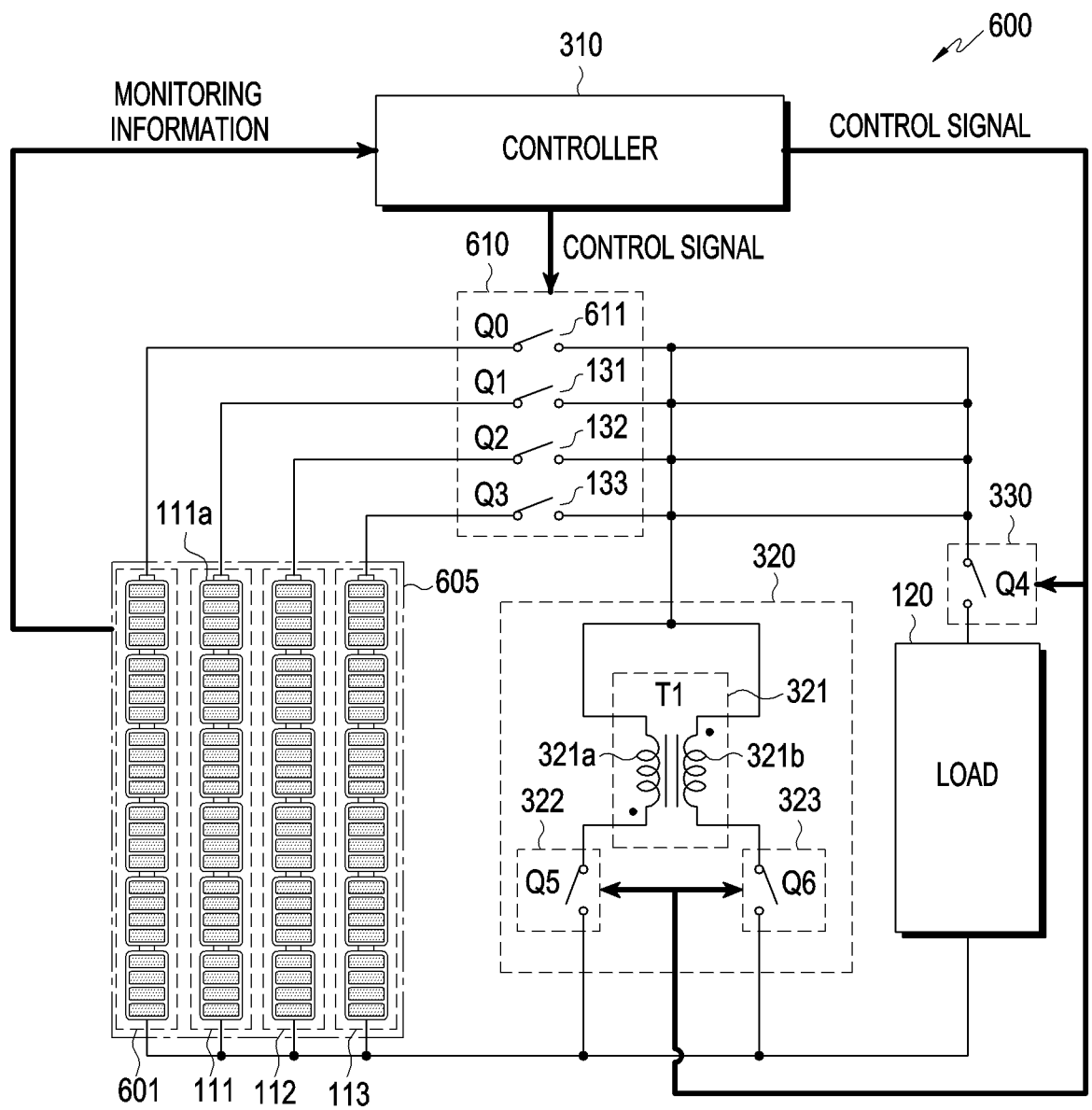
FIG. 6 is a view illustrating a configuration of an electronic device including a power delivery circuit according to an embodiment of the disclosure.

FIG. 6 is a view illustrating a configuration of an electronic device including a power delivery circuit according to an embodiment of the disclosure.

Referring to FIG. 6, an electronic device 600 may include a battery pack 605 with more capacity than the previously-described battery pack 110 may be configured by adding a new battery sub pack 601 to the battery pack 110 of FIG. 3 which includes three battery sub packs 111, 112, and 113.

According to an embodiment, when there is the need for increasing battery capacity due to aging of the battery while the electronic device 600 is driven, battery capacity may be increased by adding the fourth battery sub pack 601 or replacing an existing one as shown in FIG. 6, rather than configuring a new battery pack.

According to an embodiment, when any one of the first battery sub pack 111, the second battery sub pack 112, and the third battery sub pack 113 is broken, the battery pack 605 may be used simply by replacing the broken battery sub pack without the need for replacing the whole battery pack 605. For example, if a voltage difference occurs between the battery sub packs upon configuring the battery pack 605, the configuration of the battery may not be changed. However, according to various embodiments, providing active balancing between the battery sub packs by the power delivery circuit 320 enables adding, removing, or replacing of a battery sub pack(s).

According to an embodiment, the controller 310 may control the added fourth battery sub pack 601 by a switch Q0 611 of switching unit 610.

Figure 7A:
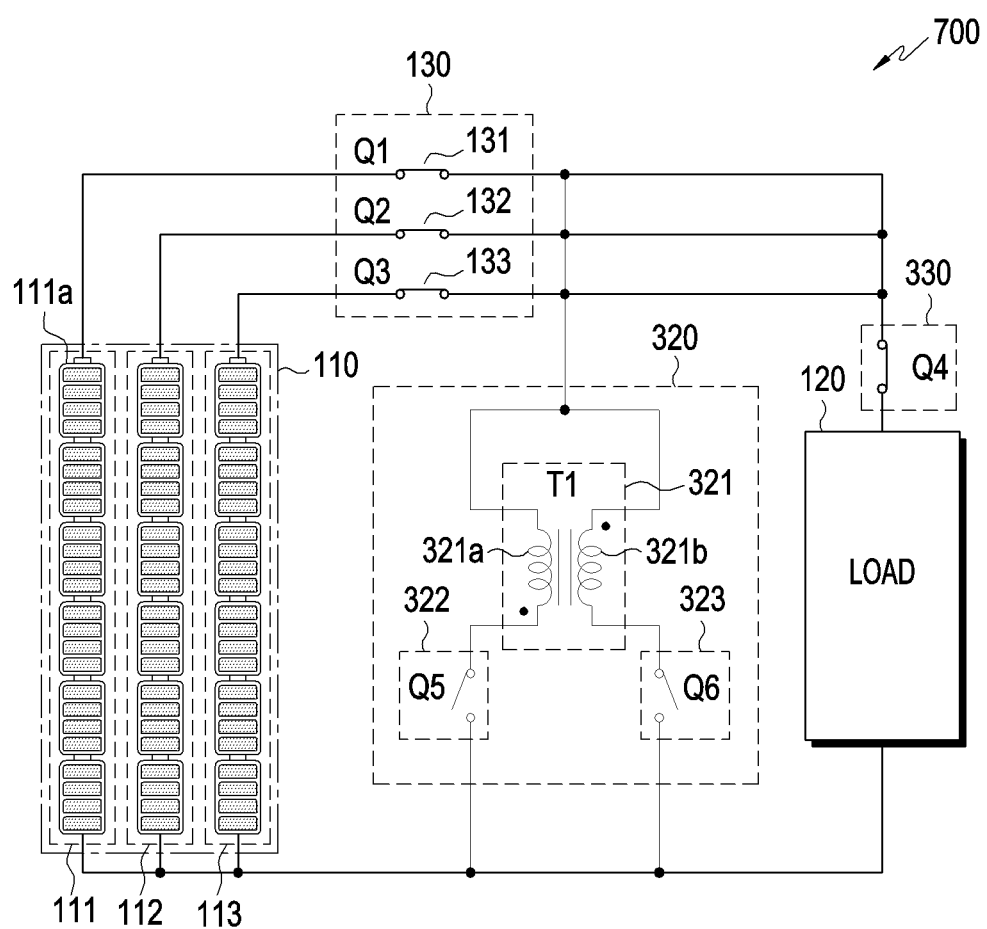
FIGS. 7A, 7B, and 7C are views illustrating operations of an electronic device in a discharging mode according to various embodiments of the disclosure.
Figure 7B:
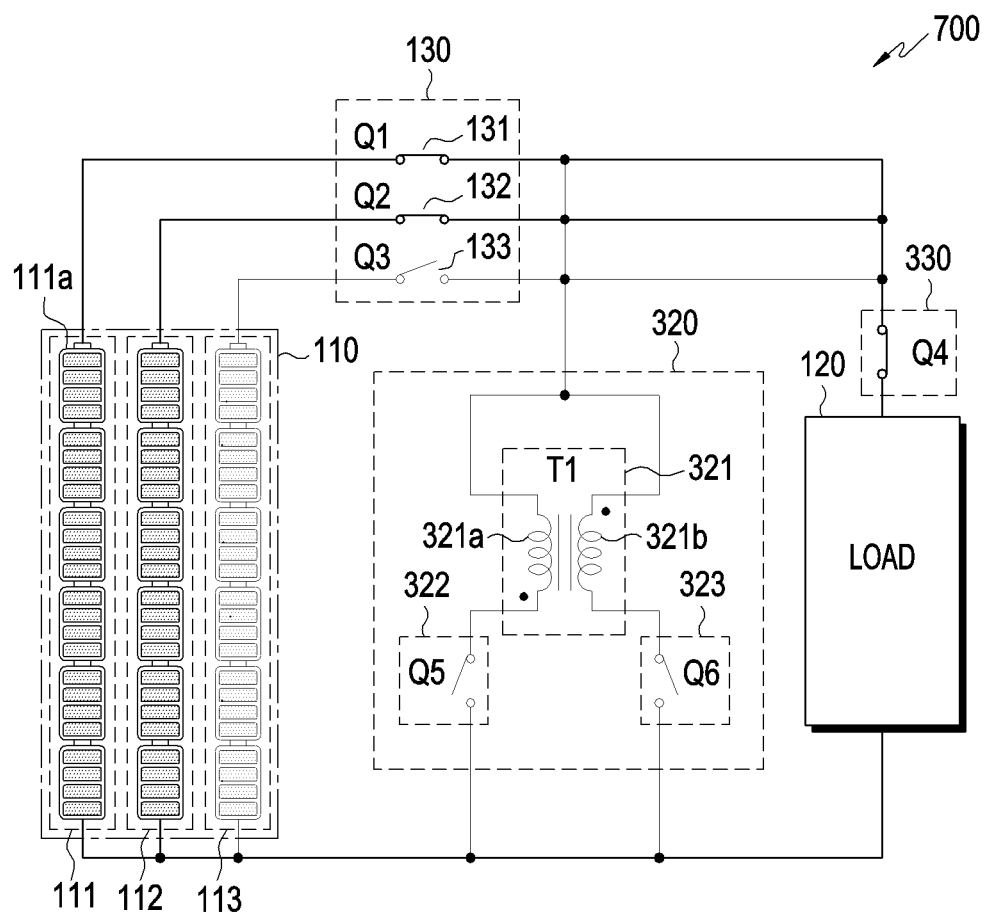
Figure 7C:
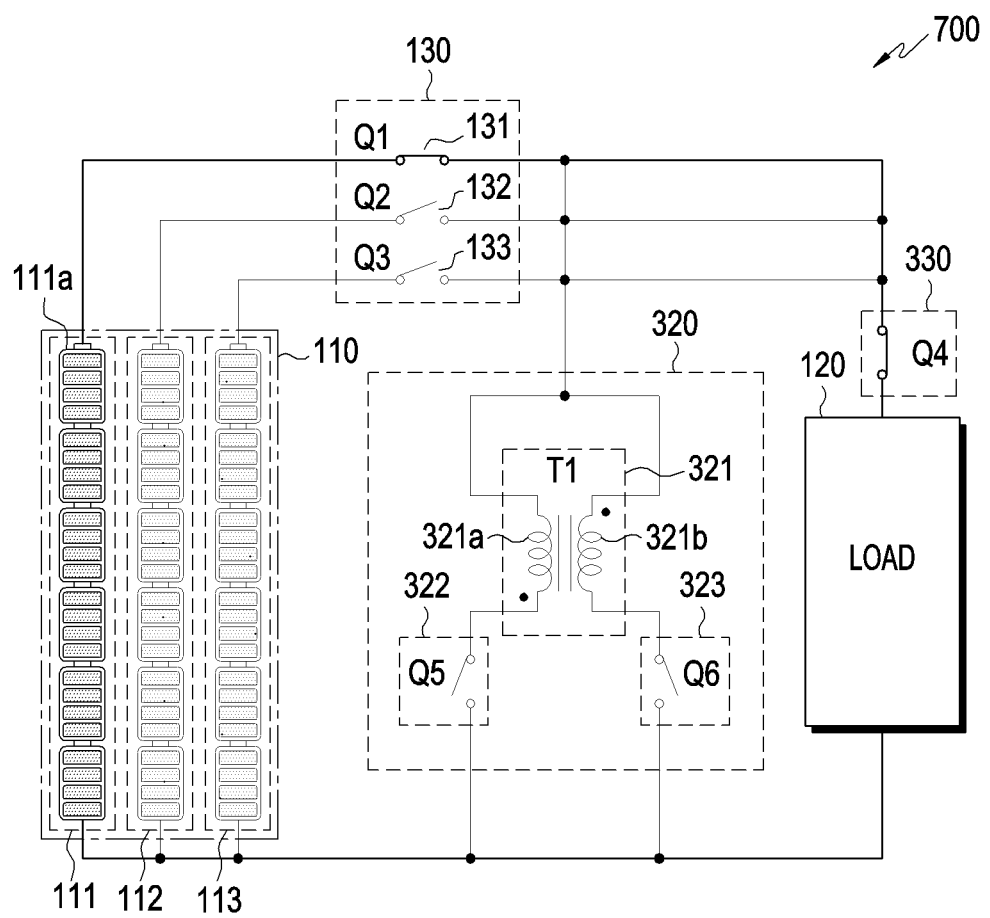

FIGS. 7A, 7B, and 7C are views illustrating operations of an electronic device 700 in a discharging mode according to various embodiments of the disclosure. The elements illustrated in FIGS. 7A, 7B, and 7C are similar to those described with reference to FIGS. 1-3, and their detailed description will not be repeated herein.

Referring to FIGS. 7A, 7B, and 7C, as the electronic device 700 performs a specific operation so that power needs to be supplied to the load 120 in the above-described circuit of FIG. 3, the controller 310 may perform control to operate in the discharging mode. In the discharging mode, the controller 310 may perform control to transmit a control signal to the fourth switch 330 which is placed at the front end of the load 120 so that the fourth switch 330 turns on. The controller 310 may determine the number of battery sub packs to supply power or which one of the battery sub packs is used to supply power among the plurality of battery sub packs 111, 112, and 113 based on the power required by the load 120 according to various scenarios of using the battery.

According to an embodiment, referring to FIG. 7A, when high power is needed as for driving a motor, the controller 310 may perform control to supply power from all of the first battery sub pack 111, the second battery sub pack 112, and the third battery sub pack 113. For example, the controller 310 may control the first switch 131, the second switch 132, and the third switch 133 all to turn on, thereby allowing the power from the first battery sub pack 111, the second battery sub pack 112, and the third battery sub pack 113 to be supplied to the load 120.

According to an embodiment, referring to FIG. 7B, when mid power is needed as for driving a sensor or display, the controller 310 may perform control to allow power to be supplied from two battery sub packs, e.g., the first battery sub pack 111 and the second battery sub pack 112. For example, the controller 310 may control the first switch 131 and the second switch 132 to turn on and the third switch 133 to turn off, so that power from the first battery sub pack 111 and the second battery sub pack 112 may be supplied to the load 120.

According to an embodiment, referring to FIG. 7C, when low power is needed as for standby power, the controller 310 may perform control to allow power to be supplied from only one battery sub pack (e.g., the first battery sub pack 111). For example, the controller 310 may control the first switch 131 to turn on and the second switch 132 and third switch 133 to turn off, so that power only from the first battery sub pack 111 may be supplied to the load 120.

As shown in FIGS. 7A, 7B, and 7C, the lifespan of each battery sub pack or battery cell may be extended by differentially controlling the use time of the battery sub packs depending on the use scenarios of the electronic device 700.

Operations in the balancing mode are described below with reference to FIGS. 8 and 9.

Figure 8:
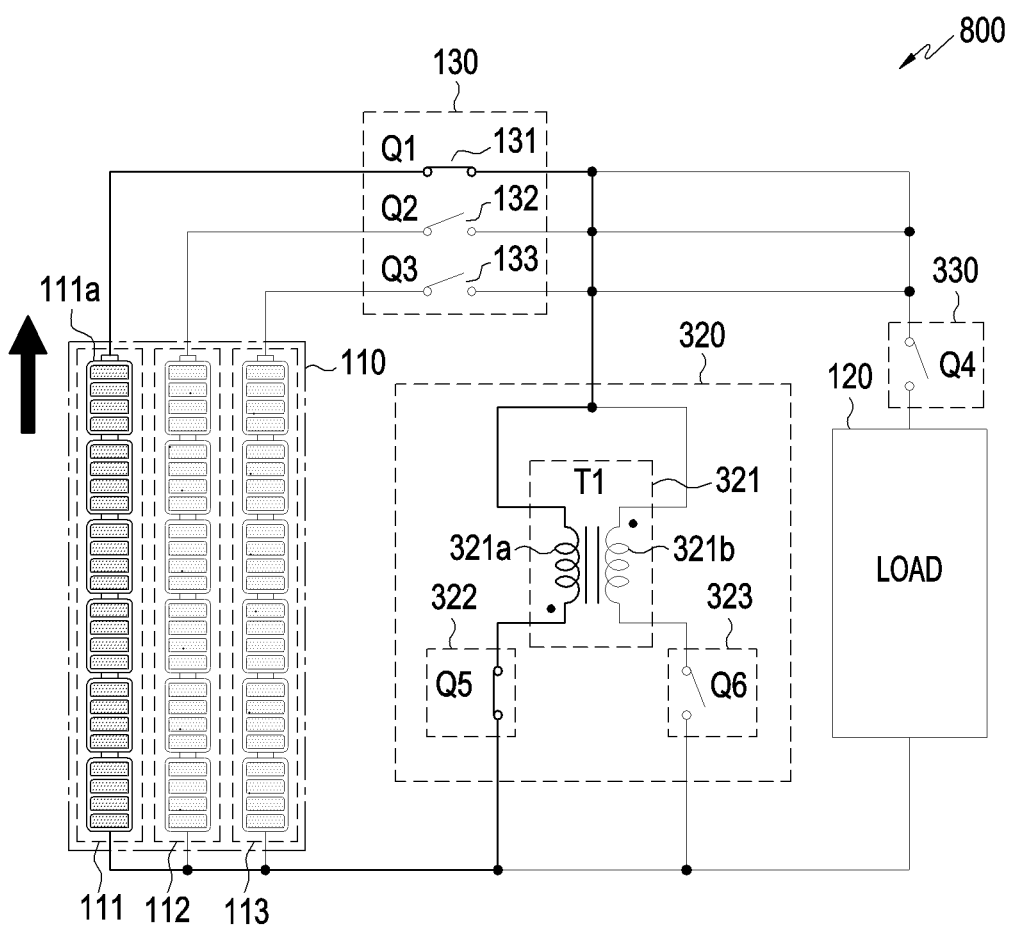
FIG. 8 is a view illustrating operations of an electronic device in a balancing mode according to an embodiment of the disclosure.
Figure 9:
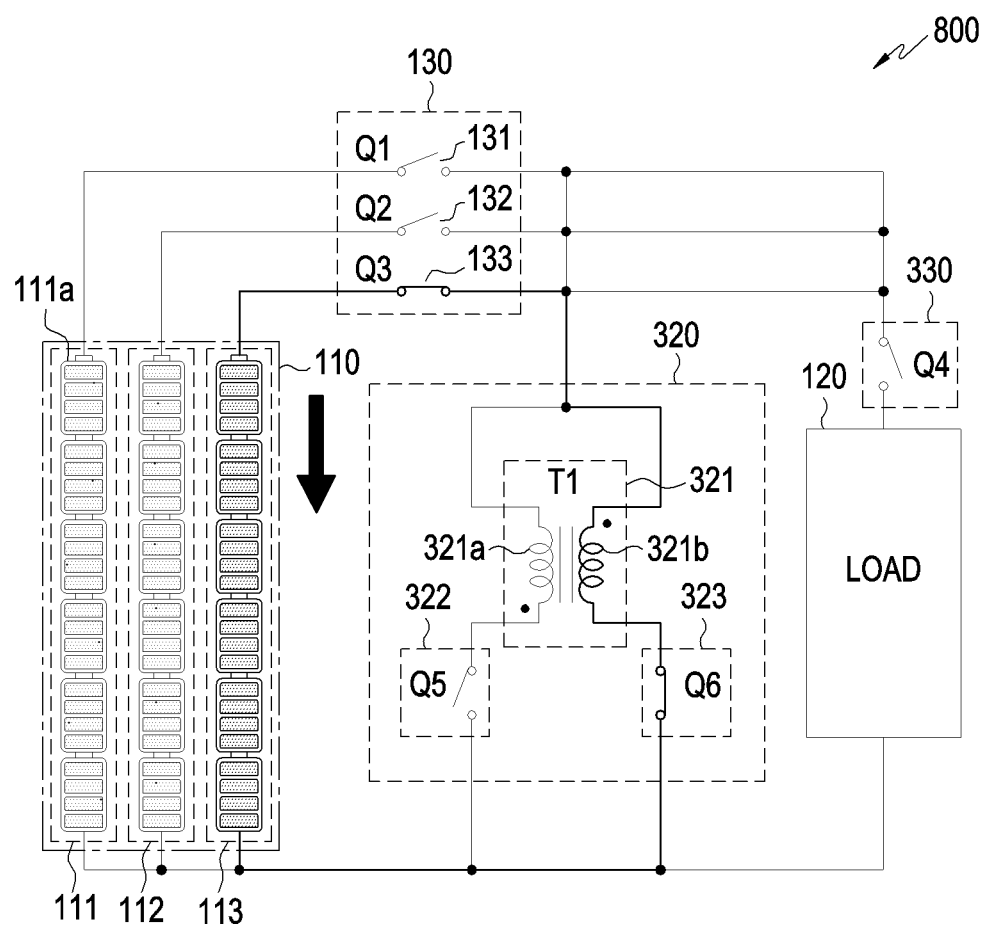
FIG. 9 is a view illustrating operations of an electronic device in a balancing mode according to an embodiment of the disclosure.

FIGS. 8 and 9 are views illustrating operations of an electronic device in a balancing mode according to various embodiments of the disclosure. The elements illustrated in FIGS. 8 and 9 are similar to those described with reference to FIGS. 1-3, and their detailed description will not be repeated herein.

Referring to FIGS. 8 and 9, upon determining that the battery module operates in the balancing mode, the controller 310 may perform control to turn off the fourth switch 330 placed at the front end of the load 120 by a control signal in the above-described circuit of FIG. 3. According to an embodiment, the controller 310 may adjust the charged amount between the battery sub packs by transferring power from at least one battery sub pack to another battery sub pack according to the operation in the balancing mode.

For example, after performing the operations in the discharging mode described with reference to FIGS. 7A, 7B, and 7C, the controller 310 may identify the monitoring information received from each battery sub pack 111, 112, and 113 and, upon determining that the charged amount or voltage of the first battery sub pack 111 is relatively larger than the charged amount or voltage of the third battery sub pack 113, supply the power of the first battery sub pack 111 to the third battery sub pack 113, thereby adjusting the voltage imbalance between the first battery sub pack 111 and the third battery sub pack 113.

Referring to FIG. 8 in particular, the controller 310 controls the first switch 131 to turn on and the other switches, i.e., the second switch 132 and the third switch 133 to turn off during the first time interval. The controller 310 controls the fifth switch 322 of the power delivery circuit 320 to turn on and the sixth switch 323 to turn off during the first time interval. The power of the first battery sub pack 111 is applied to the primary coil of the transformer 321 via the first switch 131 during the first time interval under the control of the controller 310, and the transformer 321 may temporarily store the power supplied from the first battery sub pack 111 in the magnetic core in the form of magnetic flux.

The first time interval may correspond to the $T_a$ interval of FIG. 13 according to an embodiment of the disclosure. Referring to FIG. 13, it may be identified that during the first time interval, the current ($I_{sub1}$) of the first battery sub pack 111 gradually increases from 0 A to 1 A. It may also be identified that during the first time interval, the current ($I_{sub1}$) of the first battery sub pack 111 is supplied to the transformer 321 so that the current (hi) of the transformer 321 gradually increases from 0 A to 0.9 A as well. It may be identified that during the first time interval, no current flows form the third battery sub pack 113 since the third switch 133 is in the off state.

Referring to FIG. 9 in particular, after the first time interval elapses, the controller 310 controls the first switch 131 and the second switch 132 to turn off and the third switch 133 to turn on during the second time interval. The controller 310 controls the fifth switch 322 of the power delivery circuit 320 to turn off and the sixth switch 323 to turn on during the second time interval. The power applied to the primary coil of the transformer 321 during the second time interval under the control of the controller 310 may be induced to the secondary coil and, as the sixth switch 323 connected to the secondary coil is controlled to turn on, the power induced at the secondary coil may be transmitted through the third switch 133 to the third battery sub pack 113.

The second time interval may correspond to the $T_b$ interval of FIG. 13. Referring to FIG. 13, it may be identified that the current ($I_{sub1}$) of the first battery sub pack 111 is zero during the second time interval since the first switch 131 is in the off state. It may be identified that since the power temporarily stored in the transformer 321 during the second time interval is supplied to the third battery sub pack 113, the current ($I_{T1}$) of the transformer 321 gradually reduces from 0.9 A to 0 A. Since the third battery sub pack 113 receives power from the transformer 321 during the second time interval, the third switch 133 turns on so that a current of 0.9 A flows in the moment of entering the second time interval and, if the power stored in the transformer 321 is all transferred to the third battery sub pack 113, 0 A current flows.

When the first time interval $T_a$ and the second time interval $T_b$ are defined as a $T_1$ interval as shown in FIG. 13, the above-described operations may be repeated as long as the $T_1$ time interval.

In FIG. 13, $T_a$, $T_b$ and $T_1$ may be set based on the charging/discharging characteristics of the transformer 321. For example, the length of the time interval may be set considering the charging capacity, charging time, and discharging time of the transformer 321. According to an embodiment, the first time interval or the second time interval may be 1 μs to 100 μs. The controller 310 may provide active balancing between the battery sub packs by controlling the on/off of each switch 131, 132, 133, 322, and 323 depending on the set time intervals. Referring to FIG. 13, it may be identified that the $T_1$ time interval is 0.00005 seconds (50 μs) as an interval ranging from 0.00145 seconds to 0.0015 seconds. Thus, it may be identified that the operations of the first time interval and the second time interval may be repeatedly performed every 0.00005 seconds (50 μs).

According to an embodiment, upon active balancing between the battery sub packs, the balancing power P (e.g., power transferred from the first battery sub pack 111 to the second battery sub pack 112) may be determined based on at least one of the inductance $L_m$ of the transformer 321, the switching frequency $f_s$ of the plurality of switches (e.g., the fifth switch 322 and the sixth switch 323), the duty cycle D of the first time interval and the second time interval, the voltage V1 of the first battery sub pack, and the voltage V2 of the second battery sub pack. For example, the balancing power P may be determined by Equation 1 below.

$$\text{Balancing power } (P) = \frac{V_s^2 D^2}{2 L_m f_s} \quad \text{Equation 1}$$

In Equation 1 above, $V_s$ is the voltage of the high-voltage battery sub pack (e.g., the first battery sub pack 111) among the plurality of battery sub packs, and D is the duty cycle of the first time interval ($T_a$) per charging/discharging cycle. In FIG. 13, D may be $T_a/T_1$.

According to an embodiment, the inductance ($L_m$) of the transformer 321 may be derived from Equation 1 and may be determined as shown in Equation 2.

$$L_m = \frac{D^2 V_s^2}{2 P f_s} \quad \text{Equation 2}$$

$L_m$ may be set considering the metal-oxide semiconductor field-effect transistor (MOSFET) peak current of each switch and, if $L_m$ is set, a desired balancing power may be determined by adjusting $f_s$ or D according to Equation 1 or 2.

According to an embodiment, an active balancing circuit may be designed which is set as shown in Table 1 based on Equations 1 and 2 above.

TABLE 1

| | |
|---|---|
| $L_m$(μH) | 28 |
| $V_s$(V) | 38 |
| D | 0.473 |
| $T_s$(μs) | 50 |
| $f_s$(kHz) | 20 |

TABLE 1-continued

| | |
|---|---|
| $I_{peak}$ | 3.209642857 |
| P(balancing power)(W) | 2.884506036 |

Figure 10:
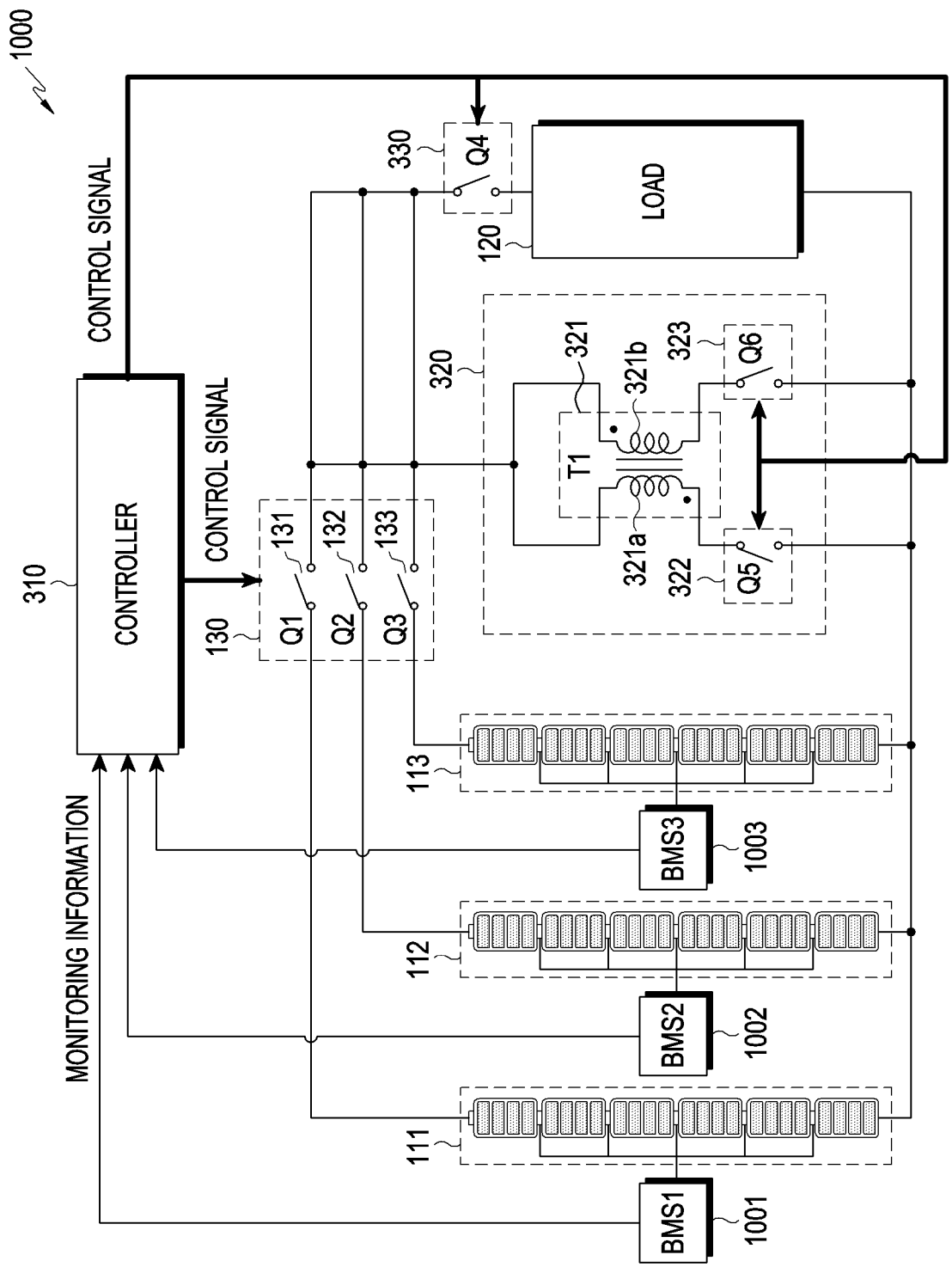
FIG. 10 is a view illustrating a configuration of an electronic device including a power delivery circuit according to an embodiment of the disclosure.

FIG. 10 is a view illustrating a configuration of an electronic device including a power delivery circuit according to an embodiment of the disclosure. The elements illustrated in FIG. 10 are similar to those described with reference to FIGS. 1-3, and their detailed description will not be repeated herein.

Referring to FIG. 10, the electronic device 1000 may include battery management systems (BMSs) 1001, 1002, and 1003 coupled to the battery sub packs 111, 112, and 113, respectively, of FIG. 3. For example, a first BMS 1001 may connect to the first battery sub pack 111, a second BMS 1002 may connect to the second battery sub pack 112, and a third BMS 1003 may connect to the third battery sub pack 113.

The BMSs 1001, 1002, and 1003 may connect to their respective corresponding battery sub packs 111, 112, and 113 and may control charging and discharging of the battery sub packs 111, 112, and 113 under the control of the controller 310. According to an embodiment, the BMSs 1001, 1002, and 1003 may perform, e.g., overcharging protection, overdischarging protection, overcurrent protection and overvoltage protection, overheating protection, and cell balancing to protect the battery sub packs 111, 112, and 113. To that end, the BMSs 1001, 1002, and 1003 may transmit the voltage, current, temperature, remaining power, lifespan, and state (e.g., SOC or SOH), and cell balancing information for each battery sub pack 111, 112, and 113 to the controller 310.

According to an embodiment, the battery state may include the state-of-health (SOH) or state-of-charging (SOC) of the battery sub packs 111, 112, and 113. The SOH may be a ratio of the current battery capacity to the capacity when the battery is manufactured. The SOH may also be denoted as battery capacity (or remaining capacity) or lifespan (or life expectancy or remaining life), or performance. The SOC may include the charging state of each battery sub pack. The SOC may also be denoted as the current charged amount or degree of charging of each battery sub pack. The cell balancing information may be inter-battery cell internal deviation information and, if the balancing time of each battery cell prolongs and thus exceeds a preset time, it may be determined to have been aged. According to an embodiment, if the BMSs 1001, 1002, and 1003 provide a report of cell balancing information to the controller 310, the controller 310 may determine whether each battery sub pack has been aged or whether each cell has been aged based on the received cell balancing information and notify the user whether to exchange on the screen.

According to an embodiment, the BMSs 1001, 1002, and 1003 may be configured separately from the battery sub packs 111, 112, and 113 or integrally with the battery sub packs 111, 112, and 113 or the battery pack 110.

Figure 11:
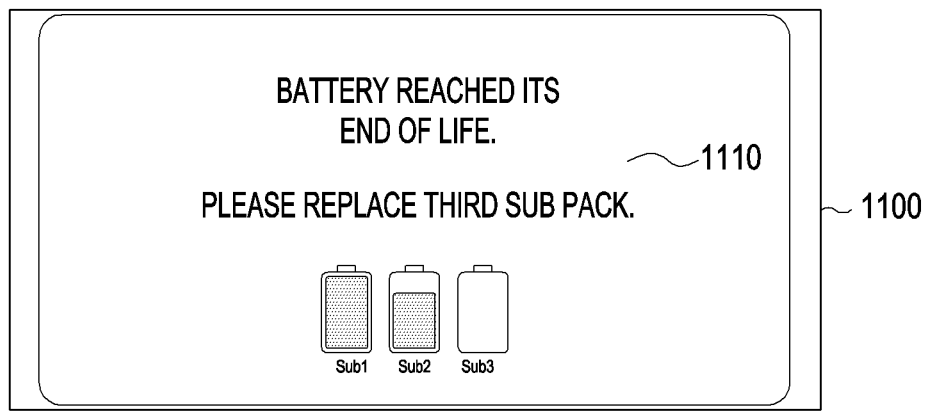
FIG. 11 is a view illustrating a battery information display screen according to an embodiment of the disclosure.

When a result of monitoring the battery sub packs 111, 112, and 113 by the BMSs 1001, 1002, and 1003 reveals that a specific battery sub pack has been aged and thus needs to be replaced, the controller 310 may control a display device 1100 of the electronic device 1000 to output a message 1110 as shown in FIG. 11.

FIG. 11 is a view illustrating a battery information display screen according to an embodiment of the disclosure.

Referring to FIG. 11, since the third battery sub pack 113 is almost dead, a message 1110 may be displayed on the screen of the display device 1100 to guide the user to replace the third battery sub pack 113.

According to an embodiment, a battery module comprises a battery pack 110 including a plurality of battery sub packs 111, 112, and 113 connectable in parallel with each other, a power delivery circuit 320 connectable to the plurality of battery sub packs, a plurality of switches 131, 132, and 133 connected between the plurality of battery sub packs and the power delivery circuit, and at least one processor (e.g., a controller 310) configured to transfer power from a first battery sub pack among the plurality of battery sub packs to a second battery sub pack among the plurality of battery sub packs, wherein, to transfer the power, the at least one processor is configured to control the plurality of switches to transmit power stored in a first battery sub pack among the plurality of battery sub packs to the power delivery circuit during a first time interval and transmit power stored in the power delivery circuit to a second battery sub pack among the plurality of battery sub packs during a second time interval.

According to an embodiment, the power delivery circuit 320 may include a primary coil 321a and a secondary coil 321b. The controller 310 may be configured to perform control to store power in the primary coil during the first time interval and transfer the stored power to the second battery sub pack based on a magnetic coupling between the primary coil and the secondary coil during the second time interval.

According to an embodiment, the power delivery circuit may include a transformer connectable to the plurality of battery sub packs.

According to an embodiment, the power delivery circuit may further include a first switch connected to a primary coil of the transformer and a second switch connected to a secondary coil of the transformer.

According to an embodiment, the controller may be configured to control the first switch to turn on and the second switch to turn off during the first time interval and the first switch to turn off and the second switch to turn on during the second time interval.

According to an embodiment, the controller may be configured to perform control to repeat the control of the first switch and the second switch performed during the first time interval and the second time interval based on voltage levels of the first battery sub pack and the second battery sub pack.

According to an embodiment, the controller may be configured to control the first switch and the second switch to turn off in a discharging mode in which power is supplied from the battery pack to a load.

According to an embodiment, the controller may be configured to control at least one of the plurality of switches to turn on to allow at least one of the plurality of battery sub packs to connect to the load in the discharging mode.

According to an embodiment, the battery module may further comprise at least one load switch connected between the at least one battery sub pack and a load. The controller may be configured to control the at least one load switch to turn off during the first time interval and the second time interval.

According to an embodiment, an amount of power transferred during the transfer of power may be determined based on at least one of an inductance of a transformer, switching frequencies of the plurality of switches, duty cycles of the first time interval and the second time interval, a voltage of the first battery sub pack, or a voltage of the second battery sub pack.

According to an embodiment, an electronic device comprises a battery pack including a plurality of battery sub packs connectable in parallel with each other, a power delivery circuit connectable to the plurality of battery sub packs, a plurality of switches connected between the plurality of battery sub packs and the power delivery circuit, and at least one processor (e.g., a controller) configured to control to transmit power stored in at least one of the plurality of battery sub packs to at least one load in a discharging mode, and control the plurality of switches to transmit power stored in a first battery sub pack among the plurality of battery sub packs to the power delivery circuit during a first time interval and transmit power stored in the power delivery circuit to a second battery sub pack among the plurality of battery sub packs during a second time interval in a balancing mode.

According to an embodiment, the power delivery circuit may include a primary coil and a secondary coil. The controller may be configured to perform control to store power in the primary coil during the first time interval and transfer the stored power to the second battery sub pack based on a magnetic coupling between the primary coil and the secondary coil during the second time interval in the balancing mode.

According to an embodiment, the power delivery circuit may include a transformer connectable to the plurality of battery sub packs.

According to an embodiment, the power delivery circuit may further include a first switch connected to a primary coil of the transformer and a second switch connected to a secondary coil of the transformer.

According to an embodiment, the controller may be configured to control the first switch to turn on and the second switch to turn off during the first time interval and the first switch to turn off and the second switch to turn on during the second time interval in the balancing mode.

According to an embodiment, the controller may be configured to control to repeat the control of the first switch and the second switch performed during the first time interval and the second time interval based on voltage levels of the first battery sub pack and the second battery sub pack.

According to an embodiment, the controller may be configured to control the first switch and the second switch to turn off in the discharging mode.

According to an embodiment, the electronic device may further comprise at least one load switch connected between the at least one battery sub pack and the at least one load. The controller may be configured to control the at least one load switch to turn off during the first time interval and the second time interval.

According to an embodiment, an amount of power transferred from the first battery sub pack to the second battery sub pack in the balancing mode may be determined based on at least one of an inductance of a transformer, switching frequencies of the plurality of switches, duty cycles of the first time interval and the second time interval, a voltage of the first battery sub pack, or a voltage of the second battery sub pack.

According to an embodiment, a battery module comprises a plurality of battery sub packs connectable in parallel with each other, a transformer connectable to the plurality of battery sub packs, and a plurality of switches connected between the plurality of battery sub packs and the transformer, wherein each of the plurality of battery sub packs includes a plurality of battery cells connected in series or parallel with each other.

Figure 12:
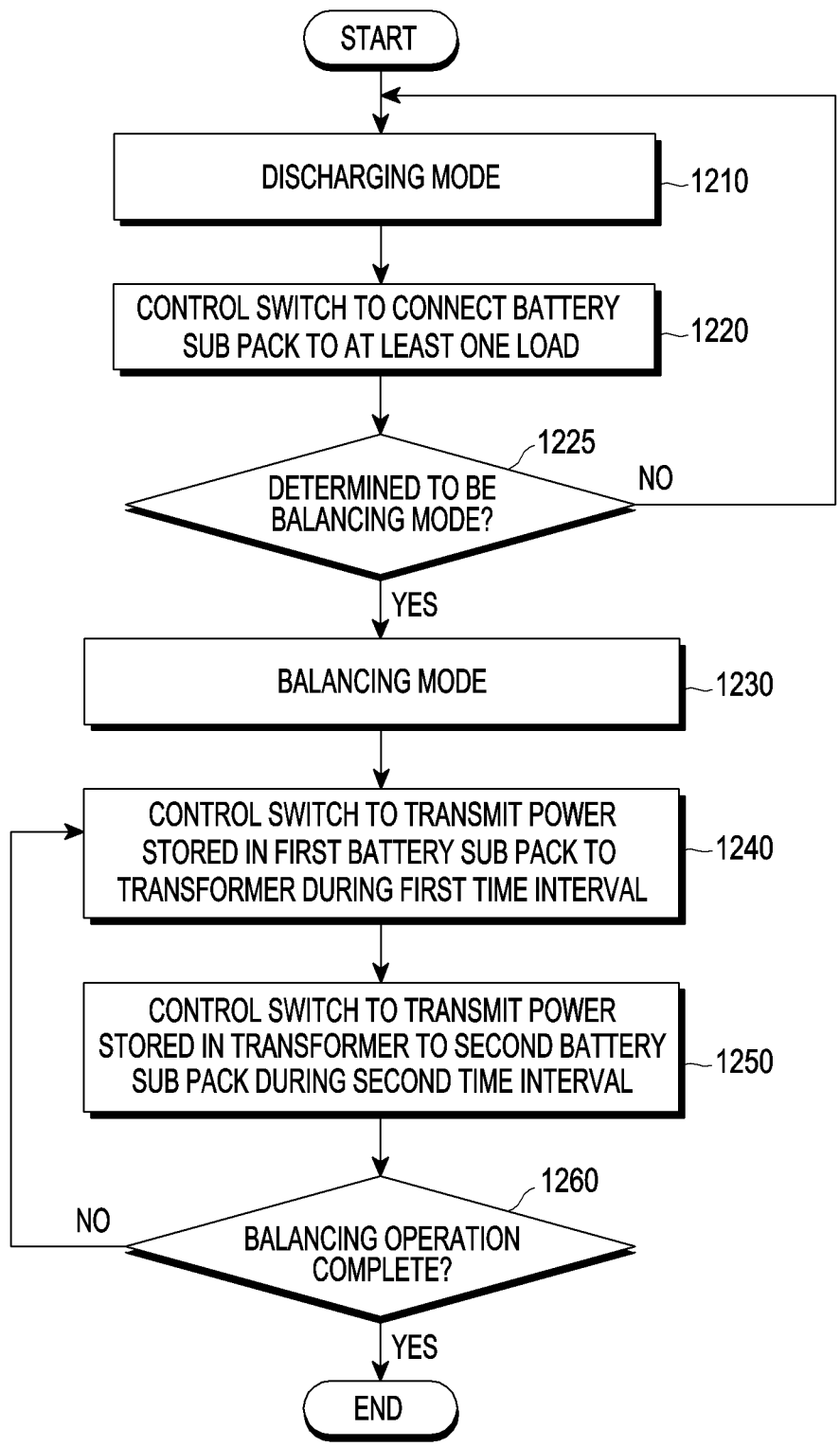
FIG. 12 is a flowchart illustrating operations of an electronic device according to an embodiment of the disclosure.

FIG. 12 is a flowchart illustrating operations of an electronic device according to an embodiment of the disclosure. The description of FIG. 12 below refers to elements described with reference to FIGS. 1-3, and their detailed description will not be repeated herein.

Referring to FIG. 12, the controller 310 of the electronic device 300 may receive battery-related monitoring information from the battery pack 110, each battery sub pack 111, 112, and 113, or each battery cell 111a. According to an embodiment, the battery-related monitoring information may include at least one of battery voltage information, current information, state-of-charge (SOC), or state-of-health (SOH), but not limited thereto.

The controller 310 of the electronic device 300 may determine a discharging mode in which power is supplied from the battery pack 110 to the load 120 or a balancing mode in which active balancing is performed between the battery sub packs 111, 112, and 113 of the battery pack, and the controller 310 may control each switch included in the electronic device 300, thereby performing operations according to each mode.

According to an embodiment, the controller 310 may determine whether to allow the battery module to currently operate in the discharging mode or in the balancing mode based on the monitoring information received from the battery pack 110 and/or load information regarding load 120 according to the operation of the electronic device 300.

According to an embodiment, although the controller 310 is described to determine whether to operate in the discharging mode or the balancing mode, other components, e.g., a BMS (e.g., the BMSs 1001, 1002, and 1003 of FIG. 10) or a processor (e.g., an application processor) may make such a determination. For example, the BMS may monitor the battery sub packs 111, 112, and 113 of the battery pack and determine to operate in the balancing mode and provide the result to the controller 310. According to an embodiment, the BMS may provide a report for the information obtained by monitoring each battery sub pack 111, 112, and 113 of the battery pack to the controller 310, and the controller 310 may determine to operate in the balancing mode based on the monitoring information. According to an embodiment, the BMS or the controller 310 may provide the monitoring information for each battery sub pack 111, 112, and 113 to a processor (e.g., an application processor) outside the battery pack 110, and the outside processor may determine to operate in the balancing mode based on the monitoring information and instruct the controller 310 to perform the operations in the balancing mode.

According to an embodiment, as the electronic device 300 performs a specific operation so that power needs to be supplied to the load 120, the controller 310 may perform control to operate in the discharging mode in operation 1210.

According to an embodiment, in the discharging mode, the controller 310 may control each switch in operation 1220, connecting at least one battery sub pack to at least one load. For example, the controller 310 may determine the number of battery sub packs to supply power or which one of the battery sub packs is used to supply power among the plurality of battery sub packs 111, 112, and 113 based on the power required by the load 120.

According to an embodiment, the controller 310 may perform control to turn on the first switch Q1 131 by a control signal upon determining to supply power to the load 120 by the first battery sub pack 111, turn on the second switch Q2 132 by a control signal upon determining to supply power to the load 120 by the second battery sub pack 112, and turn on the third switch Q3 133 by a control signal upon determining to supply power to the load 120 by the third battery sub pack 113.

According to an embodiment, the electronic device 300 may determine whether to operate in the balancing mode in operation 1225. For example, as the electronic device 100 performs no specific operation so that no power is supplied to the load 120, the controller 310 may determine to operate in the balancing mode.

According to an embodiment, when the electronic device 300 determines to operate in the balancing mode, the controller 310 may perform control to operate in the balancing mode in operation 1230. According to an embodiment, although there is no need for supplying power to the load 120, if the same voltage is maintained between the plurality of battery sub packs 111, 112, and 113 or if the voltage differences between the battery sub packs 111, 112, and 113 are within a permitted range, control may be performed not to operate in the balancing mode.

Upon determining that the battery module operates in the balancing mode, the controller 310 may perform control to turn off the fourth switch 330 placed at the front end of the load 120 by a control signal. According to an embodiment, the controller 310 may adjust the charged amount between the battery sub packs by transferring power from at least one battery sub pack to another battery sub pack according to the operation in the balancing mode.

According to an embodiment, the controller 310 may identify the monitoring information received from each battery sub pack 111, 112, and 113 and, upon determining that the charged amount or voltage of the first battery sub pack 111 is relatively larger than the charged amount or voltage of the second battery sub pack 112, supply the power of the first battery sub pack 111 to the second battery sub pack 112, thereby adjusting the voltage imbalance between the first battery sub pack 111 and the second battery sub pack 112.

According to an embodiment, in operation 1240, the controller 310 may control the switches during the first time interval to transmit power from the first battery sub pack 111 to the transformer 321.

According to an embodiment, in operation 1250, the controller 310 may control the switches during the second time interval after the first time interval elapses to transmit the power stored in the transformer 321 to the second battery sub pack 112.

FIG. 13 is a graph illustrating variations in current in a balancing mode according to an embodiment of the disclosure. The description of FIG. 13 below refers to elements described with reference to FIGS. 1-3, and their detailed description will not be repeated herein Referring to FIG. 13, the first time interval or the second time interval may be in a range from 1 μs to 100 μs. As shown in FIG. 13, as the operations of the first time interval and the second time interval are repeated, the power of the first battery sub pack 111 may be transferred to the second battery sub pack 112. The controller 310 may perform control to repeat the operations of the first time interval and the second time interval until the voltages of the first battery sub pack 111 and the second battery sub pack 112 are identical or voltage differences fall within a predetermined range.

According to an embodiment, in operation 1260, upon determining that the balancing operation is complete from the set condition, the controller 310 may terminate the balancing mode. For example, when the voltage of one battery cell is 3V to 4.2V, and six battery cells constitute one battery sub pack, the voltage of one battery sub pack may be about 20V. According to an embodiment, when the voltage of the first battery sub pack 111 is 21V and the voltage of the second battery sub pack 112 is 19V after each battery sub pack is used, operations may be performed in the balancing mode to repeatedly perform the operations of the first time interval and the operations of the second time interval, so that the voltage of the first battery sub pack 111 and the voltage of the second battery sub pack 112, both, may be adjusted to 20V.

Figure 14:
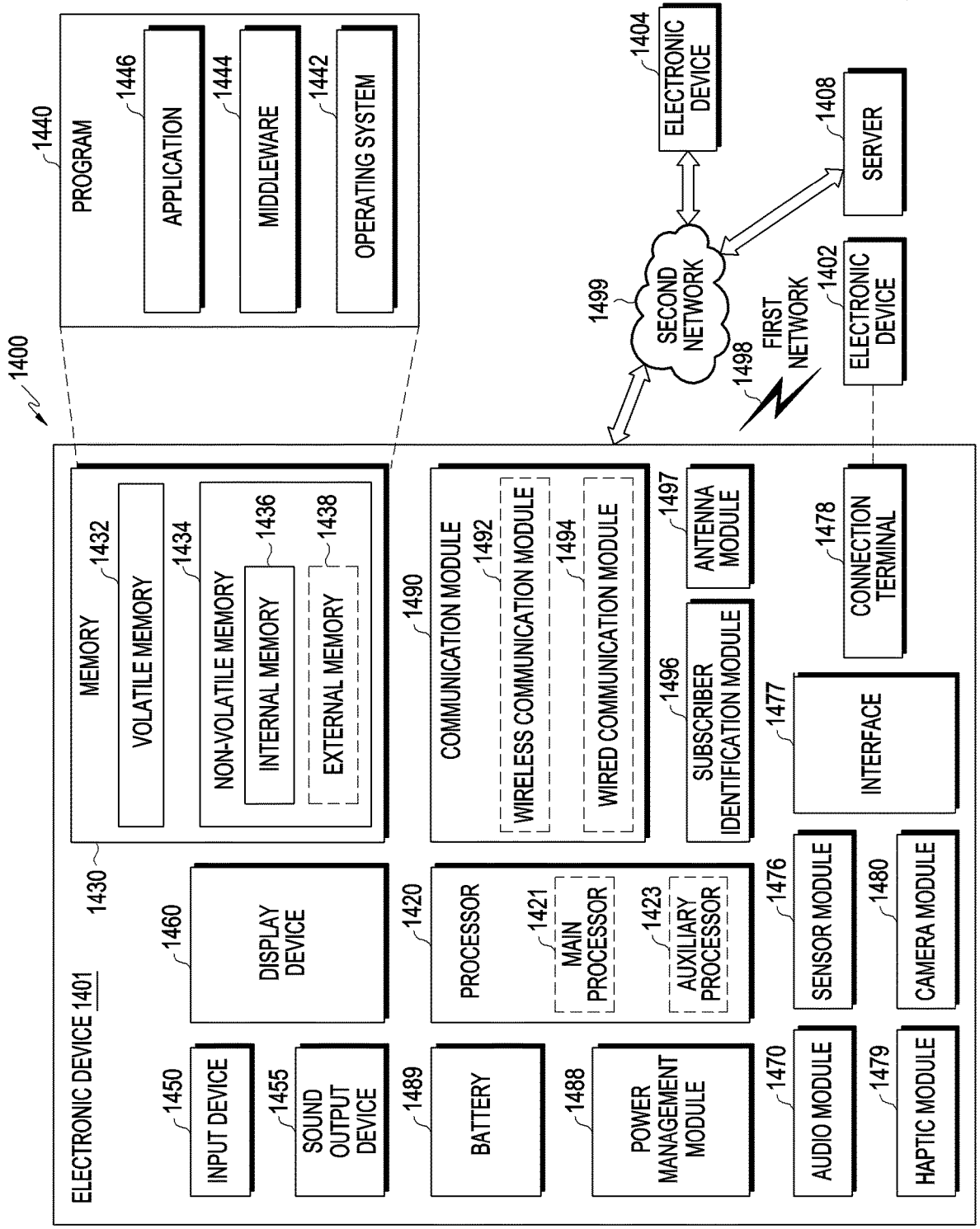
FIG. 14 is a block diagram illustrating an electronic device in a network environment according to an embodiment of the disclosure.

FIG. 14 is a block diagram illustrating an electronic device 1401 (e.g., any of the electronic devices described with reference to FIGS. 1-13) in a network environment 1400 according to an embodiment of the disclosure.

Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420 (e.g., the controller 310 of FIG. 3), a memory 1430, an input device 1450, a sound output device 1455, a display device 1460 (e.g., the display device 1100 of FIG. 11), an audio module 1470, a sensor module 1476, an interface 1477, a haptic module 1479, a camera module 1480, a power management module 1488, a battery 1489 (e.g., the battery pack 110 of FIG. 3), a communication module 1490, a subscriber identification module 1496, and an antenna module 1497. In some embodiments, the electronic device 1401 may exclude at least one (e.g., the display device 1460 or the camera module 1480) of the components or add other components. In some embodiments, some components may be implemented to be integrated together, e.g., as if the sensor module 1476 (e.g., a fingerprint sensor, an iris sensor, or an illuminance sensor) is embedded in the display device 1460.

The processor 1420 may drive, e.g., software (e.g., a program 1440) to control at least one other component (e.g., a hardware or software component) of the electronic device 1401 connected with the processor 1420 and may process or compute various data. The processor 1420 may load and process an instruction or data received from another component (e.g., the sensor module 1476 or the communication module 1490) on a volatile memory 1432, and the processor 1420 may store resultant data in a non-volatile memory 1434. According to an embodiment, the processor 1420 may include a main processor 1421 (e.g., a central processing unit (CPU) or an application processor), and additionally or alternatively, an auxiliary processor 1423 (e.g., a graphics processing unit (GPU), an image signal processor, a sensor hub processor, or a communication processor) that is operated independently from the main processor 1421 and that consumes less power than the main processor 1421 or is specified for a designated function. Here, the auxiliary processor 1423 may be operated separately from or embedded in the main processor 1421.

In such case, the auxiliary processor 1423 may control at least some of functions or states related to at least one (e.g., the display device 1460, the sensor module 1476, or the communication module 1490) of the components of the electronic device 1401, instead of the main processor 1421 while the main processor 1421 is in an inactive (e.g., sleep) state or along with the main processor 1421 while the main processor 1421 is an active state (e.g., performing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. The memory 1430 may store various data used by at least one component (e.g., the processor 1420 or sensor module 1476) of the electronic device 1401, e.g., software (e.g., the program 1440) and input data or output data for a command related to the software. The memory 1430 may include the volatile memory 1432 or the non-volatile memory 1434.

The program 1440, as software stored in the memory 1430, may include, e.g., an operating system (OS) 1442, middleware 1444, or an application 1446.

The input device 1450 may be a device for receiving a command or data, which is to be used for a component (e.g., the processor 1420) of the electronic device 1401, from an outside (e.g., a user) of the electronic device 1401. The input device 1450 may include, e.g., a microphone, a mouse, or a keyboard.

The sound output device 1455 may be a device for outputting sound signals to the outside of the electronic device 1401. The sound output device 1455 may include, e.g., a speaker which is used for general purposes, such as playing multimedia or recording and playing, and a receiver used for call receiving purposes only. According to an embodiment, the receiver may be formed integrally or separately from the speaker.

The display device 1460 (e.g., the display device 1100 of FIG. 11) may be a device for visually providing information to a user of the electronic device 1401. The display device 1460 may include, e.g., a display, a hologram device, or a projector and a control circuit for controlling the display, hologram device, or projector. According to an embodiment, the display device 1460 may include touch circuitry or a pressure sensor capable of measuring the strength of a pressure for a touch.

The audio module 1470 may convert a sound into an electrical signal and vice versa. According to an embodiment, the audio module 1470 may obtain a sound through the input device 1450 or output a sound through the sound output device 1455 or an external electronic device (e.g., an electronic device 1402 (e.g., a speaker or a headphone) wiredly or wirelessly connected with the electronic device 1401.

The sensor module 1476 may generate an electrical signal or data value corresponding to an internal operating state (e.g., power or temperature) or external environmental state of the electronic device 1401. The sensor module 1476 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 1477 may support a designated protocol enabling a wired or wireless connection with an external electronic device (e.g., the electronic device 1402). According to an embodiment, the interface 1477 may include a high definition multimedia interface (HDMI), a universal serial bus (USB) interface, a secure digital (SD) card interface, or an audio interface.

A connecting terminal 1478 may include a connector, e.g., a HDMI connector, a USB connector, an SD card connector, or an audio connector (e.g., a headphone connector), which is able to physically connect the electronic device 1401 with an external electronic device (e.g., the electronic device 1402).

The haptic module 1479 may convert an electrical signal into a mechanical stimulus (e.g., a vibration or motion) or electrical stimulus which may be recognized by a user via his tactile sensation or kinesthetic sensation. The haptic module 1479 may include, e.g., a motor, a piezoelectric element, or an electric stimulator.

The camera module 1480 may capture an image or moving images. According to an embodiment, the camera module 1480 may include one or more lenses, an image sensor, an image signal processor, or a flash.

The power management module 1488 may be a module for managing power supplied to the electronic device 1401. The power management module 1488 may be configured as at least part of, e.g., a power management integrated circuit (PMIC).

The battery 1489 (e.g., the battery module or the battery pack 110) may be a device for supplying power to at least one component of the electronic device 1401. The battery 1489 may include, e.g., a primary cell which is not rechargeable, a secondary cell which is rechargeable, or a fuel cell.

The communication module 1490 may support establishing a wired or wireless communication channel between the electronic device 1401 and an external electronic device (e.g., the electronic device 1402, the electronic device 1404, or the server 1408) and performing communication through the established communication channel. The communication module 1490 may include one or more communication processors that are operated independently from the processor 1420 (e.g., an application processor) and supports wired or wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of the wireless communication module 1492 and the wired communication module 1494 may be used to communicate with an external electronic device through a first network 1498 (e.g., a short-range communication network, such as Bluetooth, wireless-fidelity (Wi-Fi) direct, or infrared data association (IrDA)) or a second network 1499 (e.g., a long-range communication network, such as a cellular network, the Internet, or a communication network (e.g., LAN or wide area network (WAN)). The above-enumerated types of communication modules 1490 may be implemented in a single chip or individually in separate chips.

According to an embodiment, the wireless communication module 1492 may differentiate and authenticate the electronic device 1401 in the communication network using user information stored in the subscriber identification module 1496.

The antenna module 1497 may include one or more antennas for transmitting or receiving a signal or power to/from an outside. According to an embodiment, the communication module 1490 (e.g., the wireless communication module 1492) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 1401 and the electronic device 1404 via the server 1408 coupled with the second network 1499. Each of the electronic devices 1402 and 104 may be a device of a same type as, or a different type, from the electronic device 1401. According to an embodiment, all or some of operations executed on the electronic device 1401 may be run on one or more other external electronic devices. According to an embodiment, when the electronic device 1401 should perform a certain function or service automatically or at a request, the electronic device 1401, instead of, or in addition to, executing the function or service on its own, may request an external electronic device to perform at least some functions associated therewith. The external electronic device (e.g., electronic devices 1402 and 1404 or server 1408) may execute the requested functions or additional functions and transfer a result of the execution to the electronic device 1401. The electronic device 1401 may provide a requested function or service by processing the received result as it is or additionally. To that end, a cloud computing, distributed computing, or client-server computing technology may be used, for example.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., a program) containing commands that are stored in a machine (e.g., computer)-readable storage medium (e.g., an internal memory) or an external memory. The machine may be a device that may invoke a command stored in the storage medium and may be operated as per the invoked command. The machine may include an electronic device according to embodiments disclosed herein. When the command is executed by a processor (e.g., the controller 310), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, a battery module including a plurality of battery sub packs and an electronic device including the battery module may increase the lifespan of the battery pack by adjusting the use time of each battery sub pack depending on the amount of power required by the load.

According to various embodiments, a battery module including a plurality of battery sub packs and an electronic device including the battery module may slow down aging—and thus extend the lifespan—of the battery and minimize the use of battery by controlling the individual battery sub packs to supply power depending on the load requiring the battery.

According to various embodiments, a battery module including a plurality of battery sub packs and an electronic device including the battery module may provide active balancing between the plurality of battery sub packs, allowing for adding or replacing battery sub packs different from the existing battery sub packs and hence enabling continuous use of the battery pack.

While the disclosure has been shown and described with reference to various embodiments thereof, it will be understood by those skilled in the art that various changes in form and details may be made therein without departing from the spirit and scope of the disclosure as defined by the appended following claims and their equivalents.

What is claimed is:

1. A battery module, comprising:
a battery pack including a plurality of battery sub packs connectable in parallel with each other;
a power delivery circuit connectable to the plurality of battery sub packs and including a primary coil and a secondary coil;
a plurality of switches connected between the plurality of battery sub packs and the power delivery circuit; and
at least one processor configured to control the plurality of switches to:
provide energy stored in a first battery sub pack among the plurality of battery sub packs to the power delivery circuit during a first time interval,
store the energy in the primary coil during the first time interval,
transfer the stored energy to the secondary coil based on a magnetic coupling between the primary coil and the secondary coil, and
provide the energy stored in the secondary coil to a second battery sub pack among the plurality of battery sub packs during a second time interval.

2. The battery module of claim 1, wherein the power delivery circuit includes a transformer connectable to the plurality of battery sub packs.

3. The battery module of claim 2, wherein the power delivery circuit further includes:
a first switch connected to a primary coil of the transformer, and
a second switch connected to a secondary coil of the transformer.

4. The battery module of claim 3, wherein, to transfer the energy, the at least one processor is further configured to:
control the first switch to turn on and the second switch to turn off during the first time interval, and
control the first switch to turn off and the second switch to turn on during the second time interval.

5. The battery module of claim 4, wherein, to transfer the energy, the at least one processor is further configured to control to repeat the control of the first switch and the second switch performed during the first time interval and the second time interval based on voltage levels of the first battery sub pack and the second battery sub pack.

6. The battery module of claim 3, wherein the at least one processor is further configured to control the first switch and the second switch to turn off in a discharging mode in which energy is supplied from the battery pack to a load.

7. The battery module of claim 6, wherein the at least one processor is further configured to control at least one of the plurality of switches to turn on to allow at least one of the plurality of battery sub packs to connect to the load in the discharging mode.

8. The battery module of claim 1, further comprising:
at least one load switch connected between at least one battery sub pack of the plurality of battery sub packs and a load,
wherein, to transfer the energy, the at least one processor is further configured to control the at least one load switch to turn off during the first time interval and the second time interval.

9. The battery module of claim 1, wherein an amount of energy transferred during the transfer of energy is determined based on at least one of an inductance of a transformer, switching frequencies of the plurality of switches, duty cycles of the first time interval and the second time interval, a voltage of the first battery sub pack, or a voltage of the second battery sub pack.

10. The battery module of claim 1, further comprising:
a plurality of battery management modules corresponding to the plurality of battery sub packs, each battery management module configured to:

measure at least one of a voltage, a current, a temperature, a remaining energy, a lifespan, or a state of a corresponding battery sub pack, and provide the measured at least one of a voltage, a current, a temperature, a remaining energy, a lifespan, or a state of a corresponding battery sub pack to the at least one processor.

11. The battery module of claim 10, wherein an amount of energy transferred from the first battery sub pack to the second battery sub pack during the transfer of energy is determined based on the measured at least one of a voltage, a current, a temperature, a remaining energy, a lifespan, or a state of a corresponding battery sub pack.

12. The battery module of claim 1, wherein each of the plurality of battery sub packs are connected in at least a series with each other, parallel with each other, or a combination of series connections and parallel connections.

13. An electronic device, comprising:
a battery pack including a plurality of battery sub packs connectable in parallel with each other;
a power delivery circuit connectable to the plurality of battery sub packs and including a primary coil and a secondary coil;
a plurality of switches connected between the plurality of battery sub packs and the power delivery circuit; and
at least one processor configured to control to:
provide energy stored in at least one of the plurality of battery sub packs to at least one load in a discharging mode, and
control the plurality of switches to:
provide energy stored in a first battery sub pack among the plurality of battery sub packs to the power delivery circuit during a first time interval,
store the energy in the primary coil during the first time interval,
transfer the stored energy to the secondary coil based on a magnetic coupling between the primary coil and the secondary coil, and
provide the energy stored in the secondary coil to a second battery sub pack among the plurality of battery sub packs during a second time interval in a balancing mode.

14. The electronic device of claim 13, wherein the power delivery circuit includes a transformer connectable to the plurality of battery sub packs.

15. The electronic device of claim 14, wherein the power delivery circuit includes:
a first switch connected to a primary coil of the transformer, and
a second switch connected to a secondary coil of the transformer.

16. The electronic device of claim 15, wherein the at least one processor is further configured to control the first switch to turn on and the second switch to turn off during the first time interval and the first switch to turn off and the second switch to turn on during the second time interval in the balancing mode.

17. The electronic device of claim 16, wherein the at least one processor is further configured to control to repeat the control of the first switch and the second switch performed during the first time interval and the second time interval based on voltage levels of the first battery sub pack and the second battery sub pack.

18. The electronic device of claim 15, wherein the at least one processor is further configured to control the first switch and the second switch to turn off in the discharging mode.

19. The electronic device of claim 13, further comprising:
at least one load switch connected between at least one battery sub pack of the plurality of battery sub packs and the at least one load,
wherein the at least one processor is further configured to control the at least one load switch to turn off during the first time interval and the second time interval.

20. The electronic device of claim 13, wherein an amount of energy transferred from the first battery sub pack to the second battery sub pack in the balancing mode is determined based on at least one of an inductance of a transformer, switching frequencies of the plurality of switches, duty cycles of the first time interval and the second time interval, a voltage of the first battery sub pack, or a voltage of the second battery sub pack.

* * * * *